(12) United States Patent  (10) Patent No.: US 9,211,773 B2
Kitamura et al.  (45) Date of Patent: Dec. 15, 2015

(54) STRADDLE-TYPE VEHICLE

(71) Applicant: YAMAHA HATSUDOKI KABUSHIKI KAISHA, Iwata-shi, Shizuoka (JP)

(72) Inventors: Yu Kitamura, Shizuoka (JP); Kenichi Watanabe, Shizuoka (JP); Tomohito Maeda, Shizuoka (JP); Kazuhiro Nishida, Shizuoka (JP); Tatsuya Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/295,380

(22) Filed: Jun. 4, 2014

(65) Prior Publication Data

US 2014/0361502 A1    Dec. 11, 2014

(30) Foreign Application Priority Data

Jun. 7, 2013    (JP) ................. 2013-120444

(51) Int. Cl.
*B60G 13/16*    (2006.01)
*B62K 5/10*    (2013.01)
*B62K 5/05*    (2013.01)
(Continued)

(52) U.S. Cl.
CPC .............. *B60G 13/16* (2013.01); *B60G 17/005* (2013.01); *B62K 5/05* (2013.01); *B62K 5/10* (2013.01); *B60G 2204/46* (2013.01);
(Continued)

(58) Field of Classification Search
CPC .. B60G 13/16; B60G 17/005; B60G 2204/46; B60G 2300/45; B60G 2300/122; B60G 13/08; B62K 5/05; B62K 5/10; B62K 2007/02

USPC ................. 280/5.515, 5.507, 5.509, 124.103; 701/37, 38
See application file for complete search history.

(56) References Cited

U.S. PATENT DOCUMENTS 3,587,606 A * 6/1971 Howland ............................ 91/3
5,570,289 A * 10/1996 Stacey ................. B60G 17/018
280/5.504
(Continued)

FOREIGN PATENT DOCUMENTS

EP    919407 A1 *    6/1999
EP    2 151 367 A1    2/2010
(Continued)

OTHER PUBLICATIONS

Official Communication issued in corresponding European Patent Application No. 14169925.6, mailed on Jul. 24, 2014.

*Primary Examiner* — Paul N Dickson
*Assistant Examiner* — Darlene P Condra
(74) *Attorney, Agent, or Firm* — Keating and Bennett, LLP

(57) ABSTRACT

A straddle-type vehicle including left and right front wheels effectively prevents deterioration of a travel feeling caused by vibrations occurring in the left and right front wheels. The straddle-type vehicle includes a body frame, left and right front wheels, a link mechanism configured to connect the left and right front wheels with the body frame, a shock absorber configured to damp vibrations in the same phase occurring in the left and right front wheels, and a damper configured to damp vibrations in opposite phases occurring in the left and right front wheels. The damper is configured such that its damping force increases at least in a certain frequency range as the frequency of the vibrations in the opposite phases increases.

13 Claims, 10 Drawing Sheets

(51) Int. Cl.
  *B60G 17/005* (2006.01)
  *B62K 5/00* (2013.01)

(52) U.S. Cl.
  CPC ...... *B60G 2300/122* (2013.01); *B60G 2300/45* (2013.01); *B62K 2005/001* (2013.01)

(56) References Cited

U.S. PATENT DOCUMENTS

| | | | |
|---|---|---|---|
| 5,598,337 A * | 1/1997 | Butsuen | B60G 13/16 180/312 |
| 5,642,899 A * | 7/1997 | Inoue et al. | 280/5.515 |
| 5,781,873 A * | 7/1998 | Sasaki | B60G 17/015 188/281 |
| 6,092,816 A * | 7/2000 | Sekine et al. | 280/6.159 |
| 6,267,387 B1 * | 7/2001 | Weiss | 280/5.52 |
| 6,269,918 B1 * | 8/2001 | Kurusu et al. | 188/266.6 |
| 6,367,824 B1 * | 4/2002 | Hayashi | 280/62 |
| 6,406,036 B1 * | 6/2002 | Laurent et al. | 280/5.509 |
| 7,343,997 B1 * | 3/2008 | Matthies | 180/215 |
| 7,487,985 B1 * | 2/2009 | Mighell | 280/124.103 |
| 7,591,337 B2 * | 9/2009 | Suhre et al. | 180/210 |
| 7,631,721 B2 * | 12/2009 | Hobbs | 180/348 |
| 8,020,878 B2 * | 9/2011 | Hara et al. | 280/5.509 |
| 2006/0097471 A1 * | 5/2006 | Van Den Brink et al. | 280/124.103 |
| 2007/0187918 A1 * | 8/2007 | Mizuno et al. | 280/124.157 |
| 2007/0193803 A1 * | 8/2007 | Geiser | 180/215 |
| 2011/0148052 A1 | 6/2011 | Quemere et al. | |
| 2014/0049021 A1 * | 2/2014 | Huang et al. | 280/267 |

FOREIGN PATENT DOCUMENTS

| | | |
|---|---|---|
| EP | 2 368 729 A1 | 9/2011 |
| FR | 2 953 184 A1 | 6/2011 |
| JP | 3125106 B2 | 1/2001 |
| JP | 2011-195099 A | 10/2011 |
| JP | 2011-528643 A | 11/2011 |
| WO | 2007/127783 A1 | 11/2007 |

* cited by examiner

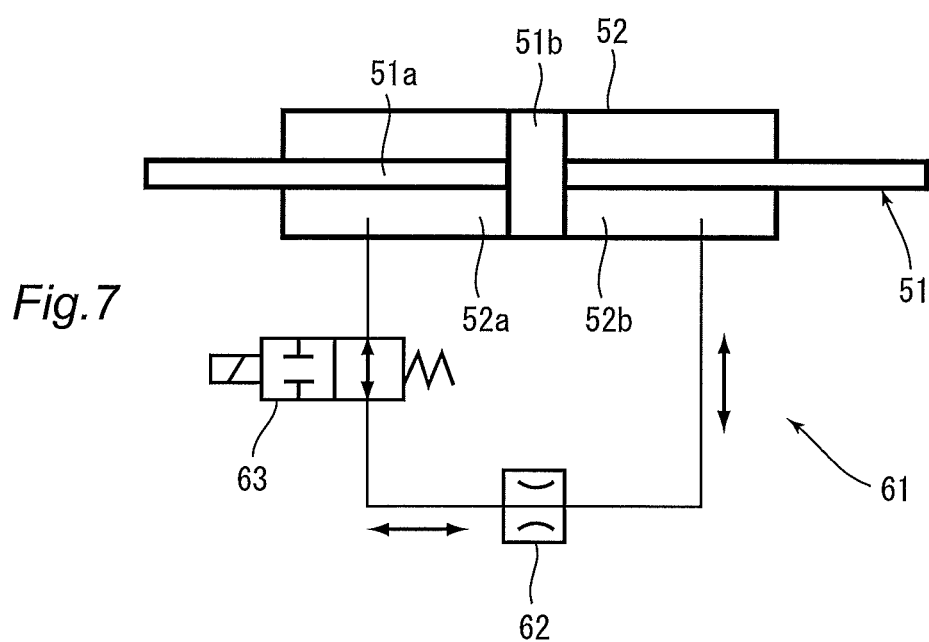

STRADDLE-TYPE VEHICLE

BACKGROUND OF THE INVENTION

1. Field of the Invention

The present invention relates to straddle-type vehicles including a link mechanism that connects the left and right front wheels with the body frame.

2. Description of the Related Art

As disclosed in WO 2007/127783, three-wheeled cycles including left and right front wheels connected with the body frame via a link mechanism are known. The link mechanism includes left and right upright rods located to the left and right with respect to the vehicle, a pair of upper suspension arms that connect the left and right upright rods with the body frame, and a pair of lower suspension arms that connect the left and right upright rods with the body frame at a location lower than the upper suspension arms. The link mechanism is generally in the shape of a rectangle, as viewed from the front of the vehicle, and includes the left and right upright rods, the upper suspension arms, and the lower suspension arms, and thus has a so-called double wishbone construction.

In the link mechanism, the upright rods and upper suspension arms are rotatably connected, and the upper suspension arms and vehicle frame are rotatably connected. Further, in the link mechanism, the upright rods and lower suspension arms are rotatably connected, and the lower suspension arms and vehicle frame are rotatably connected. That is, the link mechanism may be deformed depending on the up and down movements of the left and right front wheels, and may also be deformed as the vehicle leans.

WO 2007/127783 discloses a suspension assembly that connects a pair of upper suspension arms above the vehicle frame. This suspension assembly damps vibrations received by the left and right front wheels from the road surface.

After extensive research efforts, the present inventors discovered that some travel conditions may cause vibrations that cannot be damped by a suspension assembly as disclosed in WO 2007/127783. Such vibrations may occur in the left and/or right front wheels when the vehicle leans and turns, for example.

If such vibrations that cannot be damped by the suspension assembly occur while the vehicle is traveling, the travel feel of the vehicle significantly deteriorates.

SUMMARY OF THE INVENTION

Preferred embodiments of the present invention provide a straddle-type vehicle including left and right front wheels where the deterioration of the travel feeling caused by vibrations occurring in the left and right front wheels is effectively prevented.

A straddle-type vehicle according to a preferred embodiment of the present invention includes a body frame, left and right front wheels, a link mechanism configured to connect the left and right front wheels with the body frame, a shock absorber configured to damp vibrations in the same phase occurring in the left and right front wheels, and a damper configured to damp vibrations in opposite phases occurring in the left and right front wheels. According to a first arrangement, the damper preferably is configured such that its damping force increases at least in a certain frequency range as the frequency of the vibrations in the opposite phases increases.

The inventors of the present application attempted to improve the vehicle by, for example, increasing the damping properties of the shock absorber; however, they did not succeed in damping some vibrations with the shock absorber.

After extended research efforts, the inventors of the present application discovered that the vibrations that cannot be damped by the shock absorber are vibrations in opposite phases occurring in the left and right front wheels. That is, the inventors of the present application discovered that a vehicle with left and right front wheels may experience not only vibrations of the left and right wheels being displaced symmetrically as viewed from the front of the vehicle, but also vibrations of the left and right front wheels in opposite phases. When such vibrations in opposite phases occur in the left and right front wheels, the tires hop on the road surface adversely affecting the feel while the vehicle is traveling.

In view of this, as described above, a damper configured to damp vibrations in opposite phases occurring in the left and right front wheels is provided, in addition to the shock absorber. Thus, the damper damps vibrations in opposite phases occurring in the left and right front wheels.

If a damper configured to damp vibrations in opposite phases occurring in the left and right front wheels is provided, as described above, the damper prevents not only vibrations in the left and right front wheels, but also leaning of the vehicle.

In view of this, the damper is preferably configured such that its damping force increases at least in a certain frequency range as the frequency of vibrations in opposite phases increases, thus reducing the damping force of the damper for vibrations in relatively low frequencies caused when the vehicle body is leaning, while increasing the damping force of the damper for vibrations in relatively high frequencies when the vehicle is traveling. This prevents the travel feel of the straddle-type vehicle from deteriorating without preventing leaning of the vehicle.

According to a second arrangement, the damper is preferably configured to produce a damping force against a leaning movement of the body frame from its upright position toward a side of the vehicle.

When such a damper is provided in a straddle-type vehicle, vibrations in opposite phases that cannot be damped by the shock absorber are effectively damped.

According to a third arrangement, the link mechanism preferably includes a left side rod and a right side rod located to the left and right with respect to the vehicle to rotatably support the left and right front wheels, respectively; a left upper arm and a left lower arm rotatably connected with the left side rod and the body frame; and a right upper arm and a right lower arm rotatably connected with the right side rod and the body frame.

In a vehicle with a link mechanism described above, i.e. a so-called double wishbone construction, vibrations in opposite phases often occur in the left and right front wheels. In view of this, the above first or second arrangement is preferably used in a straddle-type vehicle with such a construction to effectively damp vibrations in opposite phases.

According to a fourth arrangement, the damper preferably is configured to produce a larger damping force than the shock absorber when vibrations in opposite phases occur in the left and right front wheels.

Thus, when vibrations in opposite phases occur in the left and right front wheels, the damper effectively damps vibrations in opposite phases.

According to a fifth arrangement, the damper is preferably configured to produce a larger damping force when vibrations in opposite phases occur in the left and right front wheels than when vibrations in the same phase occur in the left and right front wheels.

Thus, when vibrations in opposite phases occur in the left and right front wheels, the damper damps vibrations in opposite phases more effectively.

According to a sixth arrangement, the shock absorber is preferably configured to connect at least one of the left side rod, left upper arm, and left lower arm, with at least one of the right side rod, right upper arm, and right lower arm.

If the shock absorber is configured in the above manner, setting damping properties of the shock absorber to provide a sufficient damping force when one of the left and right front wheels runs on an obstacle would lead to a larger shock absorber, and would result in excessive damping properties when the left and right front wheels run on an obstacle.

On the contrary, providing a damper including the above fourth or fifth arrangements ensures a sufficient damping force even when one of the left and right front wheels runs on an obstacle. This leads to a smaller shock absorber and provide an appropriate damping force when one or both of the left and right front wheels run on an obstacle.

According to a seventh arrangement, the damper preferably is disposed to connect the left upper arm with the right lower arm, or connect the right upper arm with the left lower arm.

Thus, the damper preferably is disposed so as to be displaced more easily when the link mechanism is deformed. This increases the amount of expansion and contraction of the damper and damp vibrations in opposite phases more effectively.

According to an eighth arrangement, the damper preferably includes a left damper connected with the body frame and one of the left upper arm and left lower arm, and a right damper connected with the body frame and one of the right upper arm and right lower arm. The left and right dampers are arranged in a left-to-right direction to extend in a top-to-bottom direction.

The left and right dampers are arranged in a left-to-right direction to extend in a top-to-bottom direction, thus providing a compact damper. Further, the length of the damper is reduced compared with implementations where the damper is obliquely disposed. This reduces bending stresses in the damper caused by the link mechanism being deformed, thus improving the durability and robustness of the dampers.

According to a ninth arrangement, the damper preferably includes a cylinder, a piston body that divides the space inside the cylinder into two subspaces and configured to move reciprocally inside the cylinder, a piston rod extending from the piston body toward and then through the ends of the cylinder, and a fluid channel connected with the two subspaces inside the cylinder to allow a fluid to move therethrough depending on the movement of the piston body in the cylinder.

Since a fluid moves between the two subspaces inside the cylinder, the damper produces a constant or substantially constant damping force when the piston reciprocates inside the cylinder. This reduces variations in damping force caused by different directions of movement of the piston of the damper. This reduces variations in damping force caused by different directions in which the vehicle leans. Further, since the damper includes a cylinder, the stroke of the piston body is increased compared with rotary dampers or the like, and the damping force is easily adjusted.

According to a tenth arrangement, the vehicle preferably further includes a vehicle speed detector configured to measure the vehicle speed, and a controller configured and programmed to control the operation of the damper depending on the vehicle speed measured by the vehicle speed detector. The damper preferably includes a cylinder, a piston body that divides the space inside the cylinder into two subspaces and configured to move reciprocally inside the cylinder, a fluid channel connected with the two subspaces inside the cylinder to allow a fluid to move therethrough depending on the movement of the piston body inside the cylinder, and a shutoff valve configured to close the fluid channel. The controller controls the shutoff valve to close the fluid channel when the vehicle speed measured by the vehicle speed detector is not more than a predetermined level.

Thus, when the vehicle speed is low, the fluid channel connected with the two subspaces inside the cylinder is closed by the shutoff valve to lock the damper. This prevents the vehicle body from toppling over. On the other hand, when the vehicle speed is high and the vehicle body is caused to lean and turn, the fluid channel is left open to prevent the damper from impeding leaning of the vehicle body. This achieves a travel feeling that is close to that of a two-wheeled vehicle when the vehicle body is caused to lean and turn.

According to an eleventh arrangement, the damper preferably includes a cylinder, a piston body that divides the space inside the cylinder into two subspaces and configured to move reciprocally inside the cylinder, a fluid channel connected with the two subspaces inside the cylinder to allow a fluid to move therethrough depending on the movement of the piston body in the cylinder, and a fluid channel narrow portion provided in the fluid channel.

This allows the flow rate of the fluid to be adjusted in a stable manner for a prolonged period of time compared with implementation where a flow rate adjustment valve or the like is used to adjust the flow rate of the fluid flowing through the fluid channel. This provides stable damping properties for a prolonged period of time.

According to a twelfth arrangement, the damper preferably is constructed such that the increase rate in the damping force relative to the change in the frequency of received vibrations increases step-wise depending on the frequency.

Thus, the damping force produced by the damper is changed significantly depending on the frequency of received vibrations. That is, the damping force produced by the damper is small for a low range of frequency of received vibrations, while the damping force produced by the damper is large for a high range of frequency of received vibrations.

Thus, the damping force produced by the damper is large for a high range of frequency of received vibrations, thus more effectively damping vibrations received by the front wheels from the road surface while the vehicle is traveling. This improves the travel feel of the three-wheeled vehicle more effectively. On the other hand, for a low range of frequency of received vibrations, the damping force produced by the damper is small, thus preventing impeding leaning while the vehicle is traveling, for example. Thus, the above arrangement enables vibrations received by the front wheels to be effectively damped without impeding leaning while the vehicle is traveling.

According to a thirteenth arrangement, the damper preferably further includes a cylinder, a piston body that divides the space inside the cylinder into two subspaces and configured to move reciprocally inside the cylinder, a fluid channel connected with the two subspaces inside the cylinder to allow a fluid to move therethrough depending on the movement of the piston body in the cylinder, a plurality of fluid channel narrow portions provided in the fluid channel in parallel to produce different damping forces, and a fluid channel switch provided in the fluid channel to switch among the fluid channel narrow portions to allow the fluid to flow therethrough depending on the frequency of the received vibrations.

Using the fluid channel switch to switch among a plurality of fluid channel narrow portions provided in the fluid channel to allow the fluid to flow allows the assembly to switch among different damping properties. Thus, the twelfth arrangement is easily achieved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a schematic illustration of a damper of a three-wheeled vehicle according to another preferred embodiment of the present invention.

DETAILED DESCRIPTION OF THE PREFERRED EMBODIMENTS

Figure 1:
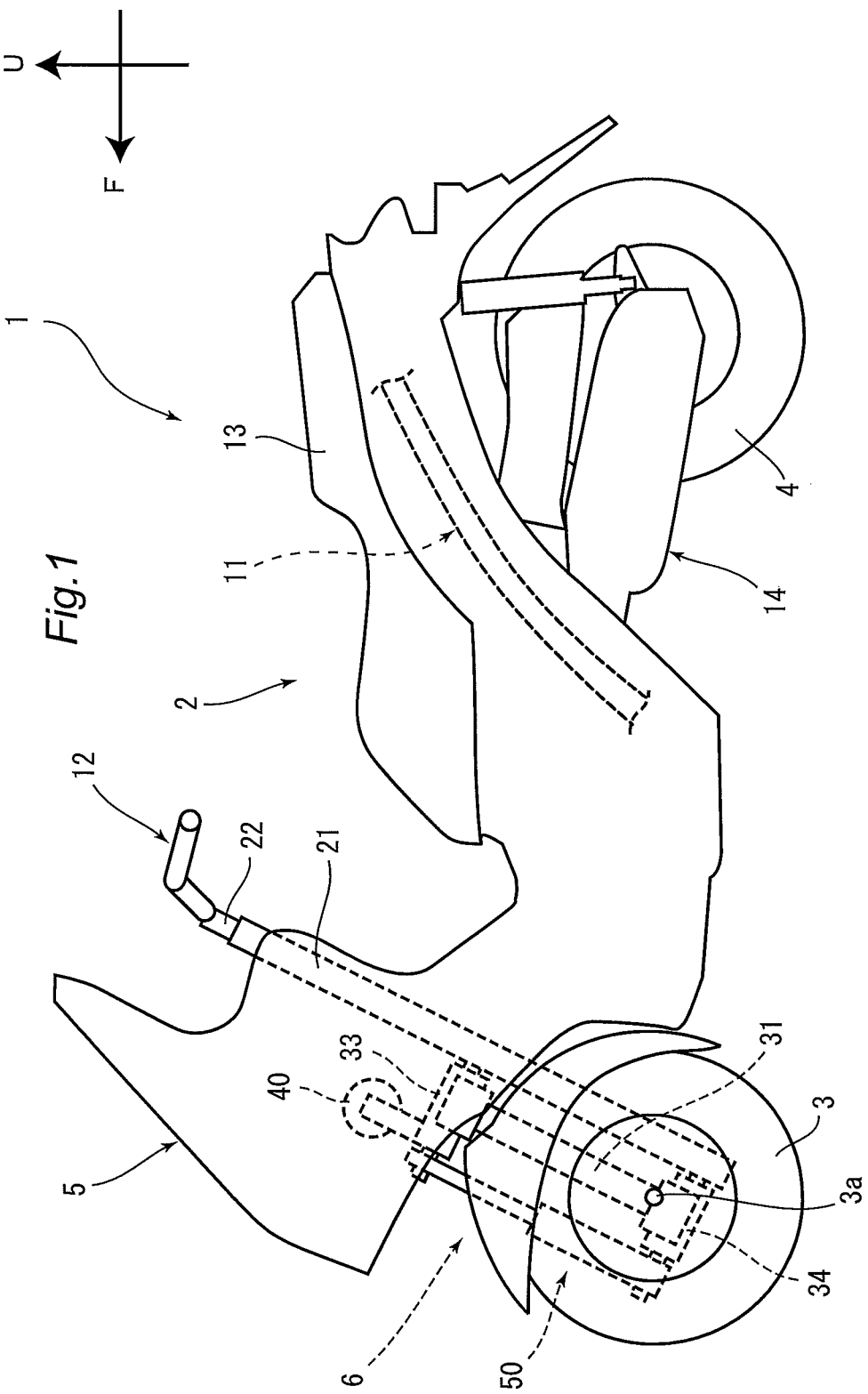
FIG. 1 is a schematic left side view of a three-wheeled vehicle according to a first preferred embodiment of the present invention.

Preferred embodiments of the present invention will now be described with reference to the drawings. The sizes of the components in the drawings do not exactly represent the sizes and size ratios of the actual components.

In the following description, front/forward, rear(ward), left and right mean such directions relative to a rider sitting on the seat 13 of the three-wheeled vehicle 1 and grasping the handlebars First Preferred Embodiment FIG. 1 is a left side view showing an overall construction of a three-wheeled vehicle 1 (straddle-type vehicle) according to a preferred embodiment of the present invention. The three-wheeled vehicle 1 includes a vehicle body 2, left and right front wheels 3 located at the front of the vehicle body 2, and one rear wheel 4 located at the rear of the vehicle body 2. Arrow F in FIG. 1 indicates the forward direction with respect to the three-wheeled vehicle 1, and arrow U the upward direction with respect to the three-wheeled vehicle 1.

The vehicle body 2 includes a body frame 11, a body cover 5, handlebars 12, a seat 13 and a power unit 14. The vehicle body 2 further includes a front wheel support mechanism 6, described further below.

The body frame 11 includes a head pipe 21. The head pipe 21 is located at the front of the three-wheeled vehicle 1. Although not shown, connected with the head pipe 21 are a main frame extending rearward with respect to the vehicle, a down frame extending from the main frame downward with respect to the vehicle, and other components.

A steering shaft 22 is located in the head pipe 21. The handlebars 12 are connected with the top of the steering shaft 22, the handlebars being rotatable relative to the head pipe 21. The front wheel support mechanism 6, described below, is connected with a front portion of the head pipe 21 with respect to the vehicle. Although not shown, the steering shaft 22 is connected with the left and right side rods 31 and 32 of the front wheel support mechanism 6, described below. Further, as described below, the left and right front wheels 3 are rotatably supported by the left and right side rods 31 and 32. Thus, as the steering shaft 22 is rotated, the left and right front wheels 3 are rotated as viewed from above.

The body frame 11 with the above construction is covered with the body cover 5. The body cover 5 may be made of resin, for example. The details of the body cover 5 will not be described.

Figure 2:
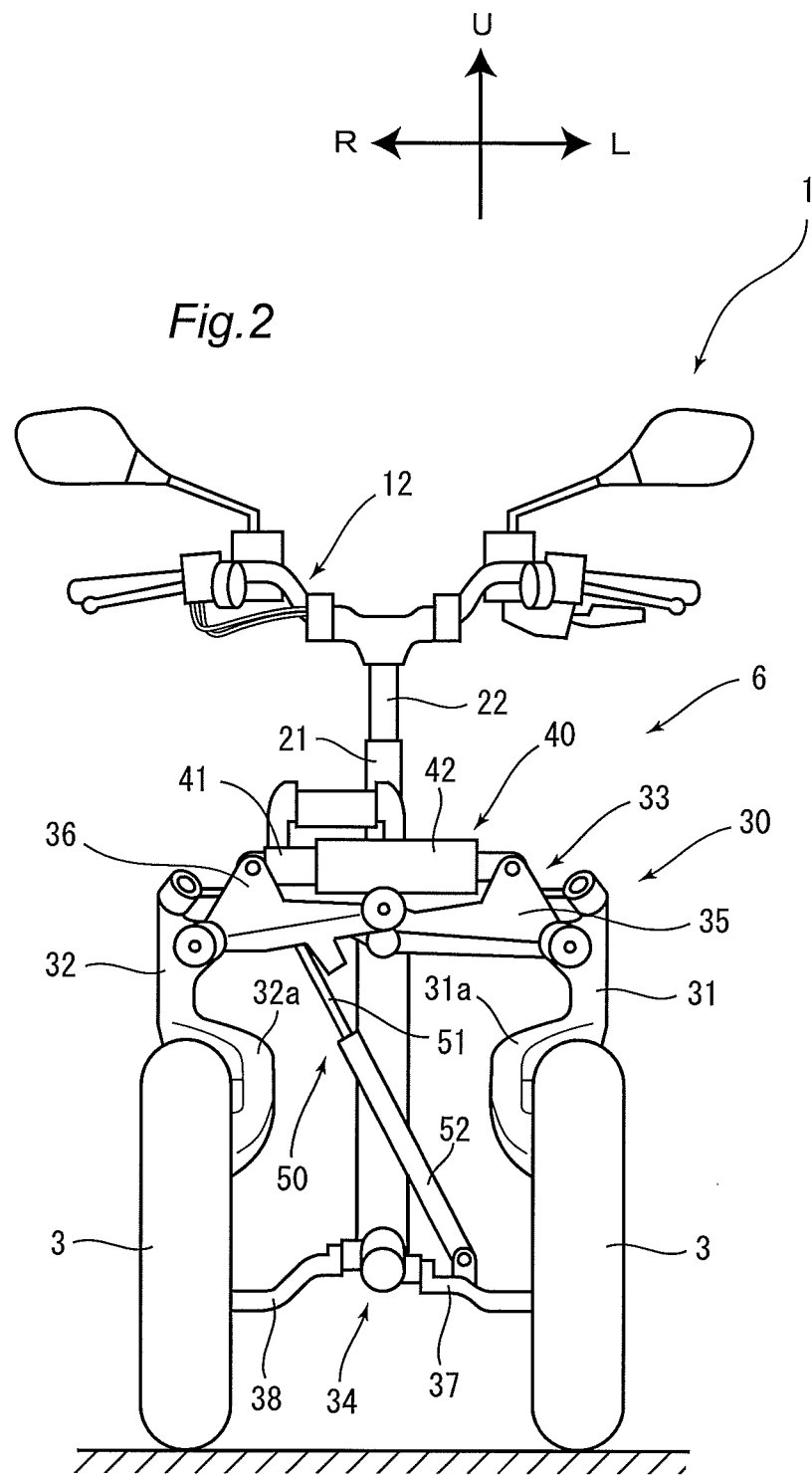
FIG. 2 shows the front of the vehicle body of the three-wheeled vehicle as viewed from the front of the vehicle without the body cover.

As shown in FIG. 2, the left and right front wheels 3 are rotatably supported by the left and right side rods 31 and 32 of the front wheel support mechanism 6. That is, the left and right front wheels 3 are located to the left and right of the front wheel support mechanism 6 connected with the head pipe 21, as described above, to sandwich the front wheel support mechanism 6.

Description of the rear wheel 4 will not be made since it preferably has the same construction as that of conventional motorcycles. Similarly, the power unit 14 including an engine, driving force transmission and other components preferably has the same construction as the power unit of conventional motorcycles, and thus its details will not be described.

Next, the construction of the front wheel support mechanism 6 supporting the left and right front wheels 3 on the head pipe 21 will be described in detail with reference to FIGS. 1 and 2.

The front support mechanism 6 includes a link mechanism 30, a shock absorber 40, and a damper 50. The link mechanism 30 is rotatably supported by the head pipe 21, and the left and right front wheels 3 are attached to the left and right sides thereof. That is, the link mechanism 30 includes a link structure that connects the left and right front wheels 3 with the head pipe 21. The shock absorber 40 is attached to the link mechanism 30 so as to damp vibrations in the same phase occurring in the left and right front wheels 3. The damper 50 is attached to the link mechanism 30 so as to damp vibrations in opposite phases occurring in the left and right front wheels 3. The construction of the shock absorber 40 and damper 50 will be described further below.

The link mechanism 30 includes left and right side rods 31 and 32 (left and right arms) located to the left and right with respect to the vehicle, an upper arm assembly 33 that connects the tops of the left and right side rods 31 and 32 with the head pipe 21, and a lower arm assembly 34 that connects the bottoms of the left and right side rods 31 and 32 with the head pipe 21.

The bottom ends of the left and right side rods 31 and 32 are connected with the left and right front wheels 3. That is, the left and right front wheels 3 are rotatably supported by the bottom ends of the left and right side rods 31 and 32.

The left side rod 31 and the right side rod 32 preferably are mirror images of each other. Similarly, the structures connecting the left and right side rods 31 and 32 with the front wheels 3, upper arm assembly 33, and lower arm assembly 34 are mirror images of each other. Accordingly, in the following description, only the left side rod 31 will be described.

The left side rod 31 extends in a top-to-bottom direction and includes a bent portion 31a in the middle as measured in a top-to-bottom direction, the bent portion 31a being bent to protrude inwardly with respect to the vehicle. A portion of the left side rod 31 that is located above the bent portion 31a is rotatably connected with the upper arm assembly 33. The left side rod 31 is disposed such that the bent portion 31a extends in a radial direction over the inner side, as measured in a vehicle width direction, of the tire of the associated front wheel 3. The axle 3a (see FIG. 1) of the front wheel 3 is rotatably connected with a portion of the left side rod 31 that is located below the bent portion 31a. The tire, made of rubber, is snapped over the periphery of the front wheel 3, which is generally in the shape of a cylinder with a bottom.

In FIG. 2, character 32a denotes the bent portion of the right side rod 32. Similar to the bent portion 31a of the left side rod 31, the bent portion 32a is disposed to extend in a radial direction over the inner side, as measured in a vehicle width direction, of the tire of the associated front wheel 3.

The upper arm assembly 33 includes a left upper arm 35 (left arm) that is rotatably connected with the left side rod 31, and a right upper arm 36 (right arm) that is rotatably connected with the right side rod 32. Each of the left and right upper arms 35 and 36 is rotatably connected with the head pipe 21. Thus, the left and right upper arms 35 and 36 rotate independently relative to the head pipe 21 and rotate relative to the left and right side rods 31 and 32.

The lower arm assembly 34 includes a left lower arm 37 (left arm) that is rotatably connected with the left side rod 31 and a right lower arm 38 (right arm) that is rotatably connected with the right side rod 32. Similar to the left and right upper arms 35 and 36 discussed above, each of the left and right lower arms 37 and 38 is rotatably connected with the head pipe 21. Thus, the left and right lower arms 37 and 38 rotate independently relative to the head pipe 21 and rotate relative to the left and right side rods 31 and 32.

Thus, the link mechanism 30 of the present preferred embodiment preferably has a so-called double wishbone construction, where the left and right arms 35 to 38 of the upper and lower arm assemblies 33 and 34 move up and down independently.

The shock absorber 40 is attached above the upper arm assembly 33, which constitutes a portion of the link mechanism 30, to connect the left and right upper arms 35 and 36. As shown in FIG. 2, the shock absorber 40 is generally parallel to the upper arm assembly 33.

The shock absorber 40 includes a columnar piston 41 and a cylinder 42. Although not shown, the piston 41 includes a piston body located at one end of the piston rod as measured along its length to divide the space inside the cylinder 42 into two subspaces. The piston 41 is constructed such that the piston body on one end thereof as measured along its length is located inside the cylinder 42 and is movable inside the cylinder 42 in an axial direction of the cylinder. The cylinder 42 is preferably filled with hydraulic oil (fluid). Thus, as the piston 41 moves in the cylinder 42, the shock absorber 40 produces a damping force.

The other end of the piston 41, located outside the cylinder 42, is rotatably connected with the right upper arm 36. The end of the cylinder 42 opposite the end into which the piston 41 is inserted is rotatably connected with the left upper arm 35.

Thus, the piston 41 of the shock absorber 40 moves relative to the cylinder 42 depending on the relative displacement of the left and right upper arms 35 and 36. Thus, the shock absorber 40 damps vibrations that cause the left and right upper arms 35 and 36 to be displaced relative to each other. For example, when vibrations in the same phase occur in the left and right upper arms 35 and 36, the shock absorber 40 damps the vibrations.

The damper 50 is attached between the upper and lower arm assemblies 33 and 34 to connect the right upper arm 36 of the upper arm assembly 33 with the left lower arm 37 of the lower arm assembly 34, for example. That is, the damper 50 is disposed on the rectangular or substantially rectangular link mechanism 30 to cross the head pipe 21 as viewed from the front of the vehicle.

As described in detail further below, the damper 50 includes a piston 51 extending through the cylinder 52, i.e., a so-called through-rod type damper. One end of the piston 51 of the damper 50 is rotatably connected with the right upper arm 36 of the upper arm assembly 33. The end of the cylinder 52 opposite the one end is rotatably connected with the left lower arm 37 of the lower arm assembly 34. As shown in FIG. 1, the damper 50 is preferably located forward of the head pipe 21 with respect to the vehicle, for example.

Since the damper 50 connects the right upper arm 36 with the left lower arm 37 of the link mechanism 30 in the manner described above, the relative displacement of the right upper arm 36 and the left lower arm 37 is reduced. That is, with the above construction, the damper 50 provides a damping force against a leaning movement of the body frame 11 from its upright position toward a side. Thus, as described further below, the damper 50 serves as a lock that prevents the head pipe 21 from tipping over, while damping vibrations that cause the right upper arm 36 and left lower arm 37 to be displaced relative to each other (i.e., vibrations in opposite phases).

Figure 3:
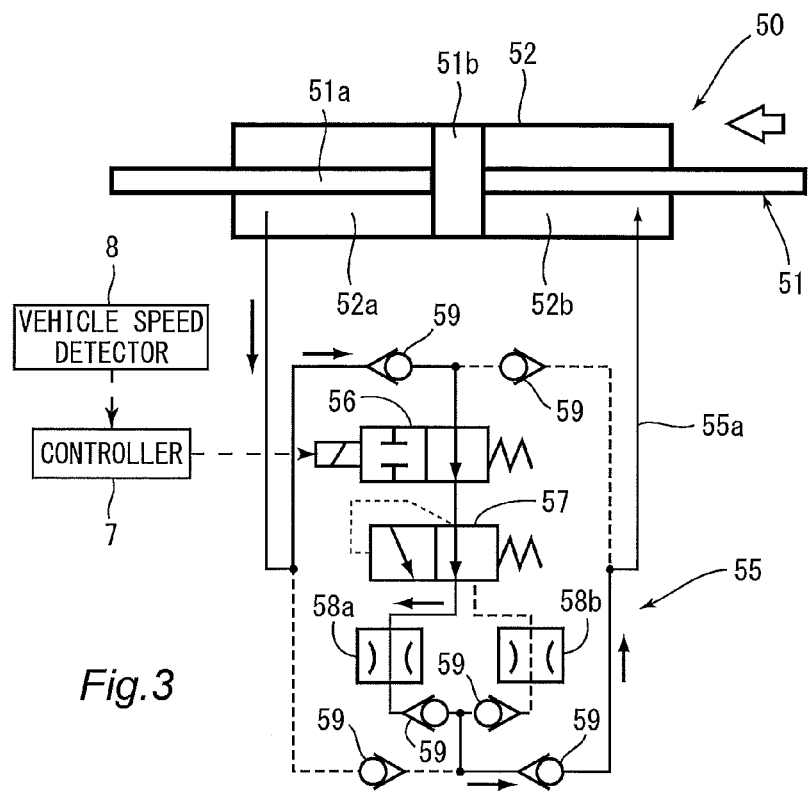
FIG. 3 is a schematic illustration of the damper where hydraulic oil flows in the damping circuit of the damping assembly.

As shown in FIG. 3, the damper 50 includes the piston 51 and the cylinder 52. The piston 51 includes a rod-shaped piston rod 51a and a piston body 51b in the middle of the piston rod 51a as measured along its length. The piston body 51b is movable inside the cylinder 52, while the piston rod 51a extends through the piston body 51b and its both ends protrude from the ends of the cylinder 52 as measured along its length. That is, the damper 50 is a so-called through-rod type damper where the piston rod 51a extends through the ends of the cylinder 52.

The space inside the cylinder 52 is preferably filled with hydraulic oil. The space inside the cylinder 52 is divided by the piston body 51b into two subspaces, i.e. a first subspace 52a and second subspace 52b. One terminal of the damping circuit 55, which includes orifices 58a and 58b and other components, is connected with the first subspace 52a, while the other terminal of the damping circuit 55 is connected with the second subspace 52b. Thus, hydraulic oil moves between the first and second subspaces 52a and 52b of the cylinder 52 via a fluid channel 55a of the damping circuit 55.

As shown in FIG. 3, the damping circuit 55 includes an electromagnetic adjustment valve 56 (shutoff valve), a fluid switching valve 57 (fluid switch), two orifices 58a and 58b (fluid channel narrow portions) with different fluid channel diameters, and a plurality of check valves 59. In the damping circuit 55, the electromagnetic adjustment valve 56, fluid channel switching valve 57, and orifices 58a and 58b are connected in the order of the electromagnetic adjustment valve 56, fluid channel switching valve 57, and orifices 58a, 58b, along the fluid flow. Check valves 59 are provided upstream of the electromagnetic adjustment valve 56 and downstream of the orifices 58a and 58b. The check valves 59 are provided in positions where they prevent hydraulic oil from flowing backward in the damping circuit 55.

The electromagnetic adjustment valve 56 is configured to switch between a state where it allows hydraulic oil to flow into the damping circuit 55 and a state where it prevents hydraulic oil from flowing into the damping circuit 55. More specifically, the electromagnetic adjustment valve 56 includes an electromagnetic valve and a spring. In the electromagnetic adjustment valve 56, a valve body (not shown) is positioned in place by the spring such that an oil path is defined inside to allow hydraulic oil to flow into the damping circuit 55. When hydraulic oil is not to flow into the damping circuit 55, the electromagnetic adjustment valve 56 actuates the electromagnetic valve to move it to a position to close the oil path of the damping circuit 55. The electromagnetic adjustment valve 56 locks the damper 50, as described further below, by preventing hydraulic oil from flowing into the damping circuit 55. Thus, the electromagnetic adjustment valve 56 works as a lock mechanism for the damper 50.

The electromagnetic adjustment valve 56 is actuated in response to a control signal provided by a controller 7 of the three-wheeled vehicle 1. The controller 7 receives a detection signal provided by a vehicle speed detector 8 that measures the vehicle speed of the three-wheeled vehicle 1. That is, the three-wheeled vehicle 1 includes the controller 7 and vehicle speed detector 8 where, in response to a detection signal provided by the vehicle speed detector 8, the controller 7 provides a control signal to the electromagnetic adjustment valve 56. When the vehicle speed detector 8 detects that the vehicle speed of the three-wheeled vehicle 1 is not more than a predetermined level, the controller 7 provides a control signal that actuates the electromagnetic adjustment valve 56 to close the oil path.

The fluid channel switching valve 57 is configured to switch between fluid channels in the damping circuit 55. That is, as described further below, two orifices 58a and 58b of different types are connected in parallel such that the fluid channel switching valve 57 switches between the fluid channels defined by the orifices 58a and 58b.

The fluid channel switching valve 57 includes in its interior a fluid channel that communicates with one orifice 58a and a fluid channel that communicates with the other orifice 58b. Further, the fluid channel switching valve 57 includes a spring. In the fluid channel switching valve 57, the valve body, not shown, is biased into a predetermined position by the spring such that the fluid channel communicating with the orifice 58a is connected with the fluid channel in the damping circuit 55. On the other hand, when the pressure of hydraulic oil in the damping circuit 55 is not less than a predetermined level (i.e., the speed of the piston 51 is not less than a threshold P), which means that the pressure is larger than the biasing force of the spring, the fluid channel switching valve 57 connects the fluid channel communicating with the orifice 58b with the fluid channel 55a in the damping circuit 55.

When hydraulic oil flows into the orifice 58a, the damper 50 produces a predetermined damping force. When hydraulic oil flows into the orifice 58b, the damper 50 produces a damping force that is larger than the predetermined damping force. Thus, in the present preferred embodiment, the orifice 58b has a smaller flow passage area than the orifice 58a. As such, when the pressure of hydraulic oil flowing through the damping circuit 55 is smaller than a predetermined level, i.e., the speed of movement of the piston 51 is smaller than the threshold P, then, causing the fluid channel switching valve 57 to allow hydraulic oil to flow into the orifice 58a produces a relatively small damping force. On the other hand, when the pressure of hydraulic oil flowing into the damping circuit 55 is not smaller than a predetermined level, i.e., the speed of movement of the piston 51 is not smaller than the threshold P, then, causing the fluid channel switching valve 57 to allow hydraulic oil to flow into the orifice 58b produces a relatively large damping force.

The damping force produced by the orifices 58a and 58b increases as the pressure of hydraulic oil flowing therethrough increases, i.e., the speed of movement of the piston 51 increases.

The check valves 59 are preferably so-called non-return valves. In the damper 50 of the present preferred embodiment, a movement of the piston 51 in the cylinder 52 causes hydraulic oil to move between the first and second subspaces 52a and 52b of the cylinder 52. Further, in the damper 50, the damping circuit 55 connected with the first and second subspaces 52a and 52b of the cylinder 52 produces a damping force regardless of the direction of movement of the piston 51. To realize such a construction of the damper 50, check valves 59 are provided in the damping circuit 55 to prevent hydraulic oil from flowing backward in the damping circuit 55 when hydraulic oil flows into the damping circuit 55 from the first subspace 52a and when hydraulic oil flows into the damping circuit 55 from the second subspace 52b.

More specifically, a check valve 59 is provided upstream of the electromagnetic adjustment valve 56 for each of the first and second subspaces 52a and 52b to allow hydraulic oil only to flow into the electromagnetic adjustment valve 56. Further, a check valve 59 is provided downstream of each of the orifices 58a and 58b to allow hydraulic oil only to flow out of the orifices 58a or 58b. Furthermore, a check valve 59 is provided downstream of each of these check valves 59 to allow hydraulic oil only to flow into the first or second subspace 52a or 52b from the orifices 58a or 58b.

FIG. 3 shows how, in the damping circuit 55 with the above-described construction, hydraulic oil flows when the piston 51 moves in the cylinder 52 to cause the piston body 51b to compress the first subspace 52a. In FIG. 3, the direction in which the piston 51 moves is indicated by a hollow arrow, and the flow of hydraulic oil in the damping circuit 55 is indicated by solid arrows. It should be noted that FIG. 3 shows the flow of hydraulic oil encountered when hydraulic oil is flowing into the orifice 58a, i.e., the speed of movement of the piston 51 is smaller than the threshold P. When the speed of movement of the piston 51 is not smaller than the threshold P, the fluid channel switching valve 57 is actuated to cause hydraulic oil to flow into the orifice 58b.

Figure 4:
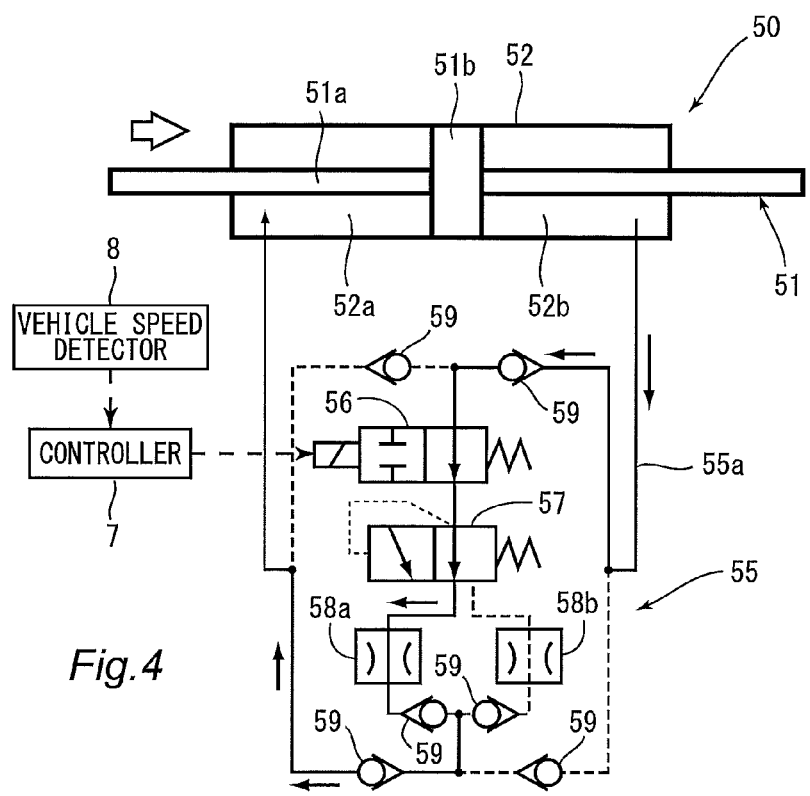
FIG. 4 is another schematic illustration of the damper where hydraulic oil flows in the damping circuit of the damping assembly.

FIG. 4 shows how, in the damping circuit 55 with the above-described construction, hydraulic oil flows when the piston 51 moves in the cylinder 52 to cause the piston head 51*b* to compress the second subspace 52*b*. In FIG. 4, similar to FIG. 3, the direction in which the piston 51 moves is indicated by a hollow arrow, and the flow of hydraulic oil in the damping circuit 55 is indicated by solid arrows. It should be noted that FIG. 4, similar to FIG. 3, shows the flow of hydraulic oil encountered when hydraulic oil is flowing into the orifice 58*a*, i.e., the speed of movement of the piston 51 is smaller than the threshold P. When the speed of movement of the piston 51 is not smaller than the threshold P, the fluid channel switching valve 57 is actuated to cause hydraulic oil to flow into the orifice 58*b*.

Thus, in a so-called through-rod type damper 50 with a piston rod 51*a* extending through the cylinder 52, the piston 51 moves relative to the cylinder 52 to provide a damping force. Moreover, as the damping circuit 55 is configured according to the present preferred embodiment, the same amount of damping force is provided regardless of the direction in which the piston 51 moves relative to the cylinder 52.

This prevents the damping force of the damper 50 from changing depending on the direction in which the three-wheeled vehicle 1 leans. This prevents the rider from feeling uncomfortable whether the three-wheeled vehicle 1 leans toward the left or right.

Furthermore, as the same amount of damping force is provided regardless of the direction in which the piston 51 moves relative to the cylinder 52, as discussed above, the damper 50 produces generally the same amount of damping force when the three-wheeled vehicle 1 leans from its upright position and when the vehicle returns from its leaning position to its upright position. This prevents the rider from feeling uncomfortable when the three-wheeled vehicle 1 leans and returns.

Moreover, as the damper 50 includes the damping circuit 55 as described above, the damping properties encountered when the body frame 11 leans toward a side with respect to the vehicle and those encountered when the body frame 11 is upright are substantially the same. That is, in the damper 50 having the above construction, the damping properties are dependent on the pressure of the hydraulic oil flowing in the damping circuit 55 regardless of the position of the body frame 11. Thus, the damper 50 provides optimal damping properties regardless of the position in which the three-wheeled vehicle 1 is while traveling.

As used herein, the damping properties encountered when the body frame 11 leans toward a side with respect to the vehicle being substantially the same as those encountered when the frame is upright includes cases where the damping properties are different to a degree that still prevents the rider from feeling uncomfortable by damping vibrations in opposite phases occurring in the left and right front wheels 3 when the body frame 11 leans toward a side with respect to the vehicle and when the frame is upright.

Figure 5:
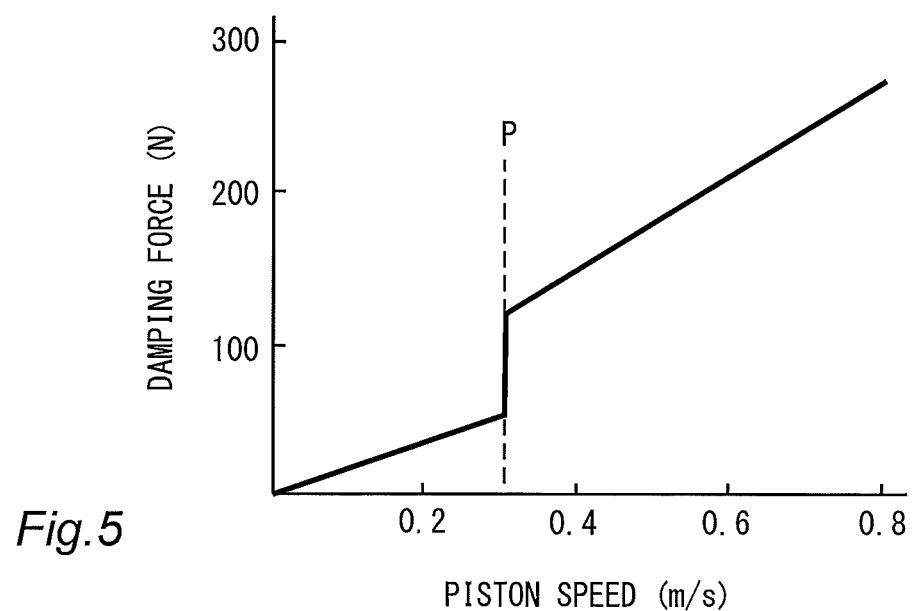
FIG. 5 is a graph illustrating how the damping force may change relative to the piston speed in a damper.

In the damping circuit 55 as described above, the fluid channel switching valve 57 switches between fluid channels depending on the pressure of hydraulic oil flowing therethrough to allow hydraulic oil to flow into one of the two orifices 58*a* and 58*b*. More specifically, the fluid channel switching valve 57 switches between the fluid channels in the damping circuit 55, damper 50 provides damping properties shown in FIG. 5. In the damper 50, the increase rate of the damping force relative to the piston speed differs when the speed of the piston 51 is relatively low (i.e., smaller than the threshold P) and when it is relatively high (i.e., not smaller than the threshold P). That is, the increase rate of the damping force encountered when the speed of the piston 51 is relatively high is larger than the increase rate of the damping force encountered when the speed of the piston 51 is relatively low. This is achieved by the fact that the fluid channel switching valve 57 switches between the two orifices 58*a* and 58*b* to allow hydraulic oil to flow therethrough depending on the pressure in the fluid channel 55*a* in the damping circuit 55.

The speed of the piston 51 is in relation to the frequency of vibrations received by the damper 50. That is, as the frequency of received vibrations increases, the speed of the piston 51 increases; as the frequency of received vibrations decreases, the speed of the piston 51 decreases. Thus, the damper 50 as described above is configured such that the increase rate of the damping force relative to the change in frequency encountered when the frequency of received vibrations is not smaller than a predetermined level is larger than the increase rate of the damping force encountered when the frequency is smaller than the predetermined level.

Thus, when the speed of movement of the piston 51 is small, i.e., the three-wheeled vehicle 1 is leaning at a curve or the like, hydraulic oil may flow into the orifice 58*a* with a larger flow passage area to prevent the damper 50 from producing an excessive damping force. On the other hand, when the speed of movement of the piston 51 is relatively large, i.e., vibrations in opposite phases are occurring between the left lower arm 37 and right upper arm 36, hydraulic oil may flow into the orifice 58*b* with a smaller flow passage area to cause the damper 50 to produce a large damping force. Thus, the damper 50 as described above produces an optimal damping force depending on the traveling condition of the three-wheeled vehicle 1, thus significantly improving the travel feel of the three-wheeled vehicle 1.

Moreover, when the three-wheeled vehicle 1 is not moving (including traveling at a low speed), the electromagnetic adjustment valve 56 of the damping circuit 55 preferably is actuated to prevent hydraulic oil from flowing into the damping circuit 55 in order to lock the damper 50. Thus, the relative displacement of the left lower arm 37 and right upper arm 36 of the link mechanism 30 is reduced by the damper 50. Thus, the displacement of the entire link mechanism 30 is reduced by the damper 50. This reduces the leaning of the head pipe 21. Thus, the damper 50 also defines and serves as a lock mechanism that locks the leaning of the head pipe 21.

In the damper 50, the electromagnetic adjustment valve 56 of the damping circuit 55 is controlled to allow hydraulic oil to flow into the damping circuit 55 when the three-wheeled vehicle 1 is traveling. That is, when the vehicle is traveling, the damper 50 does not close the fluid channel 55*a* allowing fluid to flow into the fluid channel 55*a*. This prevents the damper 50 from being locked while the three-wheeled vehicle 1 is traveling. Thus, the damper 50 effectively damps vibrations in opposite phases occurring in the left and right front wheels 3 while the three-wheeled vehicle 1 is traveling.

Figure 6A:
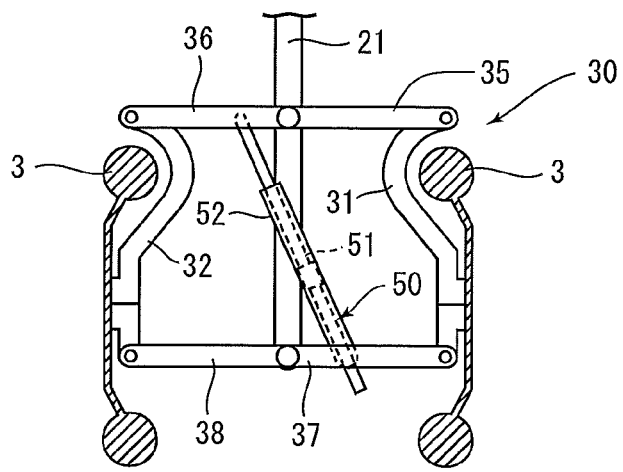
FIG. 6A is a schematic view illustrating how the link mechanism is positioned relative to the damper when the three-wheeled vehicle is positioned upright.
Figure 6B:
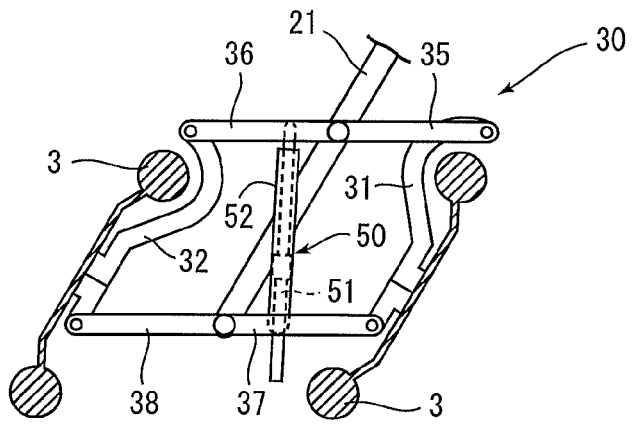
FIG. 6B is a schematic view illustrating how the link mechanism is positioned relative to the damper when the three-wheeled vehicle is leaning toward the left.
Figure 6C:
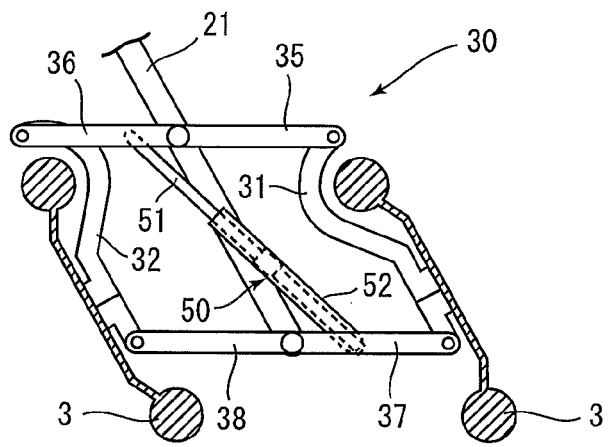
FIG. 6C is a schematic view illustrating how the link mechanism is positioned relative to the damper when the three-wheeled vehicle is leaning toward the right.
Figure 6D:
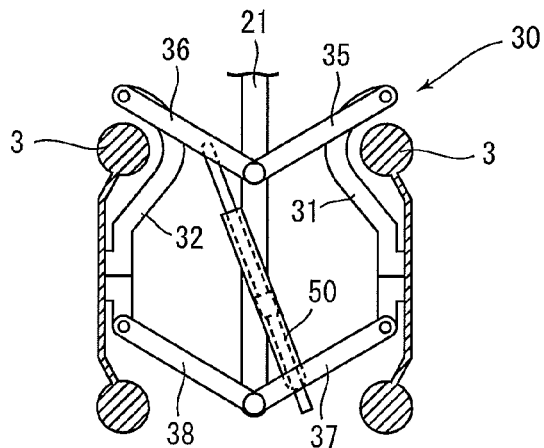
FIG. 6D is a schematic view illustrating how the link mechanism is positioned relative to the damper when vibrations in the same phase occur in the left and right front wheels of the three-wheeled vehicle.
Figure 6E:
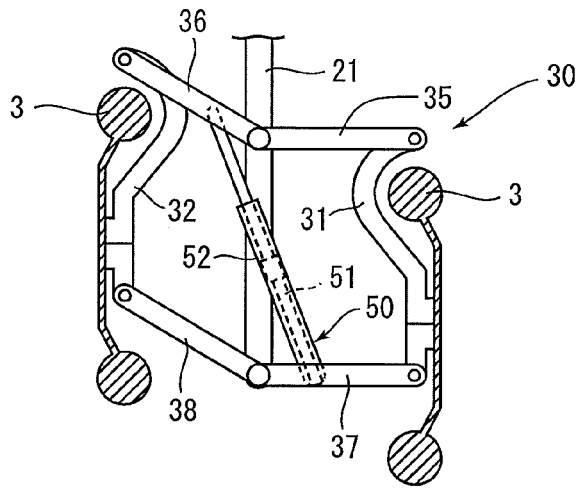
FIG. 6E is a schematic view illustrating how the link mechanism is positioned relative to the damper when vibrations in opposite phases occur in the left and right front wheels of the three-wheeled vehicle.
Figure 6F:
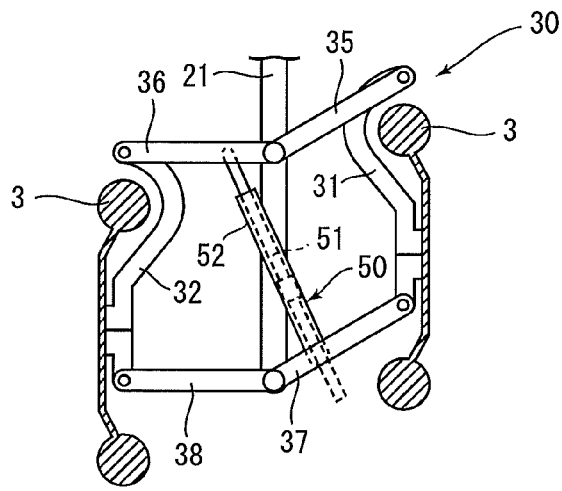
FIG. 6F is a schematic view illustrating how the link mechanism is positioned relative to the damper when vibrations in opposite phases occur in the left and right front wheels of the three-wheeled vehicle.

Next, the relationship between operations of the link mechanism 30 and those of the damper 50 will be described with reference to FIGS. 6A to 6F. FIG. 6A illustrates the relationship between the link mechanism 30 and damper 50 encountered when the three-wheeled vehicle 1 is upright on a horizontal road surface. FIGS. 6B and 6C each illustrate the relationship between the link mechanism 30 and damper 50 encountered when the three-wheeled vehicle 1 is leaning toward the left or right. FIG. 6D illustrates the relationship between the link mechanism 30 and damper 50 encountered when vibrations in the same phase occur in the left and right front wheels 3. FIGS. 6E and 6F each illustrate the relationship between the link mechanism 30 and damper 50 encountered when vibrations in opposite phases occur in the left and right front wheels 3. FIGS. 6A to 6F schematically illustrate the link mechanism 30, damper 50, and components near them to facilitate the understanding of the relationship between the link mechanism 30 and damper 50.

As shown in FIG. 6A, when the three-wheeled vehicle 1 is upright, the link mechanism 30 is generally rectangular as viewed from the front of the vehicle. The damper 50 connects the left lower arm 37 with the right upper arm 36 of the link mechanism 30 and is disposed to cross the head pipe 21.

As shown in FIG. 6B, when the three-wheeled vehicle 1 leans toward the left, the link mechanism 30 defines a parallelogram as viewed from the front of the vehicle. In the case of FIG. 6B, the link mechanism 30 leans in a direction that compresses the damper 50, causing the piston 51 of the damper 50 to be pushed into the cylinder 52. At this moment, the piston body 51b moves in the cylinder 52 allowing hydraulic oil to flow into the damping circuit 55 to produce a damping force. Still, in this case, an excessive damping force is not produced since hydraulic oil flows into the orifice 58a of the damping circuit 55. This prevents significantly impeding leaning of the three-wheeled vehicle 1.

As shown in FIG. 6C, similar to the case of FIG. 6B, when the three-wheeled vehicle 1 leans toward the right, the link mechanism 30 also defines a parallelogram as viewed from the front of the vehicle. In the case of FIG. 6C, the link mechanism 30 leans in a direction that causes the damper 50 to extend causing the piston 51 of the damper 50 to be drawn out of the cylinder 52. At this moment, the piston body 51b moves in the cylinder 52 such that hydraulic oil flows into the damping circuit 55 to produce a damping force. Still, in this case, an excessive damping force is not produced since hydraulic oil flows into the orifice 58a of the damping circuit 55. This prevents significantly impeding leaning of the three-wheeled vehicle 1.

Thus, the damper 50 is provided between the left lower arm 37 and right upper arm 36 of the link mechanism 30 so as to produce a damping force against a movement of the body frame 11 leaning from a state where it is upright on a horizontal road surface toward a side of the vehicle.

As shown in FIG. 6D, when vibrations in the same phase occur in the left and right front wheels 3 of the three-wheeled vehicle 1, the link mechanism 30 is deformed symmetrically as viewed from the front of the vehicle. In this case, the damper 50 disposed between the left lower arm 37 and right upper arm 36 of the link mechanism 30 has a length that is substantially unchanged from the case of FIG. 6A. Thus, vibrations in the same phase occurring in the left and right front wheels 3 cannot be damped by the damper 50. In the present preferred embodiment, such vibrations in the same phase occurring in the left and right front wheels 3 are damped by the shock absorber 40 (see FIG. 2) attached to the top of the upper arm assembly 33.

As shown in FIGS. 6E and 6F, when vibrations in opposite phases occur in the left and right front wheels 3 of the three-wheeled vehicle 1, only one front wheel 3 is displaced upward as viewed from the front of the vehicle. Thus, the distance between the left lower arm 37 and right upper arm 36 of the link mechanism 30 changes. Thus, in the damper 50 connecting the left lower arm 37 with the right upper arm 36, the piston 31 moves relative to the cylinder 32 allowing hydraulic oil to flow into the damping circuit 55 to produce a damping force. At this moment, hydraulic oil flows into the orifice 58b of the damping circuit 55 producing a large damping force. This effectively damps vibrations in opposite phases occurring in the left and right front wheels 3.

In the present preferred embodiment, a three-wheeled vehicle 1 includes a body frame 11, left and right front wheels 3, a link mechanism 30 configured to connect the left and right front wheels 3 with the body frame 11, a shock absorber 40 configured to damp vibrations in the same phase occurring in the left and right front wheels 3, and a damper 50 configured to damp vibrations in opposite phases occurring in the left and right front wheels 3. The damper 50 is configured such that its damping force increases at least in a certain frequency range as the frequency of the vibrations in the opposite phases increases.

The inventors of the present application attempted to improve the vehicle by, for example, increasing the damping properties of the shock absorber 40; however, they did not succeed in damping some vibrations with the shock absorber 40. After extended research efforts, the inventors of the present application discovered that the vibrations that cannot be damped by the shock absorber 40 are vibrations in opposite phases occurring in the left and right front wheels 3. That is, the inventors of the present application discovered that a three-wheeled vehicle 1 with left and right front wheels 3 may experience not only vibrations of the left and right wheels 3 being displaced symmetrically as viewed from the front of the vehicle, but also vibrations of the left and right front wheels 3 in opposite phases. When such vibrations in opposite phases occur in the left and right front wheels 3, the tires hop on the road surface adversely affecting the feel while the vehicle is traveling.

In view of this, as described above, a damper 50 configured to damp vibrations in opposite occurring phases in the left and right front wheels 3 is provided, in addition to the shock absorber 40. Thus, the damper 50 damps vibrations in opposite phases occurring in the left and right front wheels 3.

If a damper 50 configured to damp vibrations in opposite phases occurring in the left and right front wheels 3 is provided, as described above, the damper 50 prevents not only vibrations in the left and right front wheels 3, but also leaning of the vehicle.

In view of this, the damper 50 may be configured such that its damping force increases at least in a certain frequency range as the frequency of vibrations in opposite phases increases, thus reducing the damping force of the damper 50 for vibrations in relatively low frequencies caused when the vehicle body is leaning, while increasing the damping force of the damper 50 for vibrations in relatively high frequencies when the vehicle is traveling. This prevents the travel feel of the three-wheeled vehicle 1 from deteriorating without preventing leaning of the vehicle.

In the present preferred embodiment, the damper 50 is configured to produce a damping force against a leaning movement of the body frame 11 from its upright position toward a side of the vehicle. Since such a damper 50 is provided in the three-wheeled vehicle 1, vibrations in opposite phases that cannot be damped by the shock absorber 40 that is configured to damp vibrations in the same phase occurring in the left and right front wheels 3 or the like is effectively damped.

In the present preferred embodiment, the link mechanism 30 preferably includes a left side rod 31 and a right side rod 32 located to the left and right with respect to the vehicle to rotatably support the left and right front wheels 3, respectively; a left upper arm. 35 and a left lower arm 37 rotatably connected with the left side rod 31 and the body frame 11; and a right upper arm 36 and a right lower arm 38 rotatably connected with the right side rod 32 and the body frame 11.

In a vehicle with a link mechanism 30 described above, i.e., a so-called double wishbone construction, vibrations in an opposite phases often occur in the left and right front wheels 3. In view of this, the above construction of the damper 50 may be used in a three-wheeled vehicle 1 with such a construction to effectively damp vibrations in opposite phases.

In the present preferred embodiment, the damper 50 is configured to produce a larger damping force than the shock absorber 40 when vibrations in opposite phases occur in the left and right front wheels 3. Thus, when vibrations in opposite phases occur in the left and right front wheels 3, the damper 50 effectively damps vibrations in opposite phases.

In the present preferred embodiment, the damper 50 is configured to produce a larger damping force when vibrations in opposite phases occur in the left and right front wheels 3 than when vibrations in the same phase occur in the left and right front wheels 3.

Thus, when vibrations in opposite phases occur in the left and right front wheels 3, the damper 50 damps vibrations in opposite phases more effectively.

In the present preferred embodiment, the shock absorber 40 is disposed to connect at least one of the left side rod 31, left upper arm 35, and left lower arm 37, with at least one of the right side rod 32, right upper arm 36, and right lower arm 38.

If the shock absorber 40 is disposed in the above manner, setting damping properties of the shock absorber 40 to provide a sufficient damping force when one of the left and right front wheels 3 runs on an obstacle would lead to a larger shock absorber 40, and would result in excessive damping properties when the left and right front wheels 3 run on an obstacle.

On the contrary, providing a damper 50 as described above provides a sufficient damping force even when one of the left and right front wheels 3 runs on an obstacle. This achieves a smaller shock absorber 40 and an appropriate damping force when one or both of the left and right front wheels 3 run on an obstacle.

In the present preferred embodiment, the damper 50 is preferably disposed to connect the right upper arm 36 with the left lower arm 37.

Thus, the damper 50 is preferably configured so as to be displaced more easily when the link mechanism 30 is deformed. This increases the amount of expansion and contraction of the damper 50 and damp vibrations in opposite phases more effectively.

In the present preferred embodiment, the damper 50 preferably includes a cylinder 52, a piston body 51*b* that divides the space inside the cylinder 52 into two subspaces 52*a* and 52*b* and configured to move reciprocally inside the cylinder 52, a piston rod 51*a* extending from the piston body 51*b* toward and then through the ends of the cylinder, and a fluid channel 55*a* connected with the two subspaces 52*a* and 52*b* inside the cylinder 52 to allow a fluid to move therethrough depending on the movement of the piston body 51*b* in the cylinder 52.

Since a fluid moves between the two subspaces 52*a* and 52*b* inside the cylinder 52, the damper 50 is configured to produce a constant or substantially constant damping force when the piston 51 reciprocates inside the cylinder 52. This significantly reduces variations in damping force caused by different directions of movement of the piston 51 of the damper 50. This significantly reduces variations in damping force caused by different directions in which the vehicle leans. Further, since the damper 50 is of a cylinder-type, the stroke of the piston body 51*b* is increased compared with rotary dampers or the like and the damping force is easily adjusted.

In the present preferred embodiment, the vehicle preferably further includes a vehicle speed detector 8 configured to detect the vehicle speed, and a controller 7 configured and programmed to control the operation of the damper 50 depending on the vehicle speed detected by the vehicle speed detector 8. The damper 50 preferably includes a cylinder 52, a piston body 51*b* that divides the space inside the cylinder 52 into two subspaces 52*a* and 52*b* and is configured to move reciprocally inside the cylinder 52, a fluid channel 55*a* connected with the two subspaces 52*a* and 52*b* inside the cylinder 52 to allow a fluid to move therethrough depending on the movement of the piston body 51*b* inside the cylinder 52, and an electromagnetic switching valve 56 configured to close the fluid channel 55*a*. The controller 7 uses the electromagnetic switching valve 56 to close the fluid channel 55*a* when the vehicle speed detected by the vehicle speed detector 8 is not more than a predetermined level.

Thus, when the vehicle speed is low, the fluid channel 55*a* connected with the two subspaces 52*a* and 52*b* inside the cylinder 52 is closed by the electromagnetic switching valve 56 to lock the damper 50. This prevents the vehicle body from toppling over. On the other hand, when the vehicle speed is high and the vehicle body is caused to lean and turn, the fluid channel 55*a* preferably is left open to prevent the damper 50 from impeding leaning of the vehicle body. This produces a travel feeling that is close to that of a two-wheeled vehicle when the vehicle body is caused to lean and turn.

In the present preferred embodiment, the damper 50 preferably includes a cylinder 52, a piston body 51*b* that divides the space inside the cylinder 52 into two subspaces 52*a* and 52*b* and is configured to move reciprocally inside the cylinder 52, a fluid channel 55*a* connected with the two subspaces 52*a* and 52*b* inside the cylinder 52 to allow a fluid to move therethrough depending on the movement of the piston body 51*b* in the cylinder 52, and orifices 58*a* and 58*b* provided in the fluid channel 55*a*.

This allows the flow rate of the fluid to be adjusted in a stable manner for a prolonged period of time compared with the implementation where a flow rate adjustment valve or the like is used to adjust the flow rate of the fluid flowing through the fluid channel 55*a*. This provides stable damping properties for a prolonged period of time.

In the present preferred embodiment, the damper 50 is constructed such that the increase rate in the damping force relative to the change in the frequency of received vibrations increases step-wise depending on the frequency.

Thus, the damping force produced by the damper 50 is changed significantly depending on the frequency of received vibrations. That is, the damping force produced by the damper 50 is small for a low range of frequency of received vibrations, while the damping force produced by the damper 50 is large for a high range of frequency of received vibrations.

Thus, the damping force produced by the damper 50 is large for a high range of frequency of received vibrations, thus more effectively damping vibrations received by the front wheels 3 from the road surface while the vehicle is traveling. This improves the travel feel of the three-wheeled vehicle 1 more effectively. On the other hand, for a low range of frequency of received vibrations, the damping force produced by the damper 50 is small, thus preventing impeding leaning while the vehicle is traveling, for example. Thus, the above arrangement allows vibrations received by the front wheels 3 to be effectively damped without impeding leaning while the vehicle is traveling.

In the present preferred embodiment, the damper 50 preferably further includes a cylinder 52, a piston body 51*b* that divides the space inside the cylinder 52 into two subspaces 52*a* and 52*b* and configured to move reciprocally inside the cylinder 52, a fluid channel 55*a* connected with the two subspaces 52*a* and 52*b* inside the cylinder 52 to allow a fluid to move therethrough depending on the movement of the piston body 51b in the cylinder, a plurality of orifices 58a and 58b provided in the fluid channel 55a in parallel to produce different damping forces, and a fluid channel switching valve 57 provided in the fluid channel 55a to switch among the orifices 58a and 58b to allow the fluid to flow therethrough depending on the frequency of the received vibration.

Using the fluid channel switching valve 57 to switch among a plurality of orifices 58a and 58b provided in the fluid channel 55a to allow the fluid to flow allows the assembly to switch among different damping properties. Thus, the arrangement that switches among different damping properties depending on the frequency is easily achieved.

Second Preferred Embodiment

Figure 8:
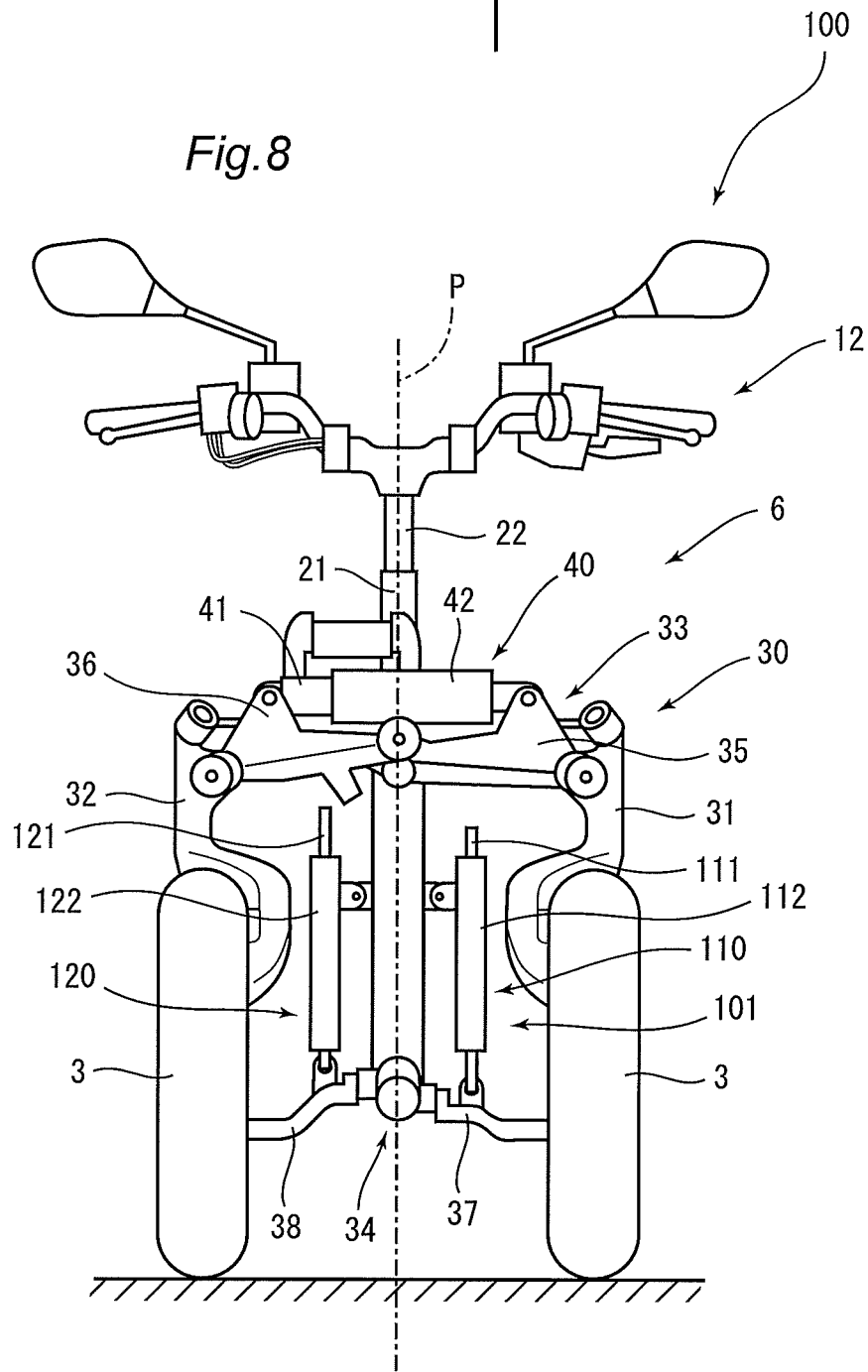
FIG. 8 is a view of a three-wheeled vehicle according to a second preferred embodiment of the present invention that is analogous to FIG. 2.

FIG. 8 schematically illustrates the front of a three-wheeled vehicle 100 according to a second preferred embodiment as viewed from the front of the vehicle without the body cover. In the second preferred embodiment, the construction of the damper 101 is different from that of the damper 50 of the first preferred embodiment. In the following description, the components that are the same as in the first preferred embodiment are labeled with the same characters and their description will not be made, and only the components different compared with the first preferred embodiment will be described.

More specifically, as shown in FIG. 8, the damper 101 includes a left damper 110 and a right damper 120. The left damper 110 is connected with the body frame 11 and left lower arm 37. The right damper 120 is connected with the body frame 11 and right lower arm 38. The left and right dampers 110 and 120 are arranged in a left-to-right direction to extend in a top-to-bottom direction, as viewed from the front of the vehicle. That is, the left damper 110 is located to the left of the vehicle body center P to extend in a top-to-bottom direction as viewed from the front of the vehicle. The right damper 120 is located to the right of the vehicle body center P to extend in a top-to-bottom direction as viewed from the front of the vehicle. Since the left and right dampers 110 and 120 preferably have the same construction, only the left damper 110 will be described below.

The left damper 110 includes a piston 111 and a cylinder 112. Similar to the damper 50 of the first preferred embodiment, the left damper 110 is a so-called through-rod type damper where the piston 111 extends through the cylinder 112. One end of the piston 111 of the left damper 110 is rotatably connected with the left lower arm 37. The end of the cylinder 112 that is opposite the end thereof adjacent the one end of the piston is rotatably connected with the body frame 11.

As discussed above, the left damper 110 connects the body frame 11 with the left lower arm 37 to reduce the relative displacement of the body frame 11 and left lower arm 37. That is, in the above arrangement, the left damper 110 provides a damping force against a leaning movement of the body frame 11 (head pipe 21) from its upright position toward the left. Further, as discussed below, the left damper 110 also works to prevent the body frame 11 from tipping over.

Similar to the left damper 110, the right damper 120 includes a piston 121 and a cylinder 122. The right damper 120 preferably has the same construction as the left damper 110 except that one end of the piston 121 is rotatably connected with the right lower arm 38.

Figure 9:
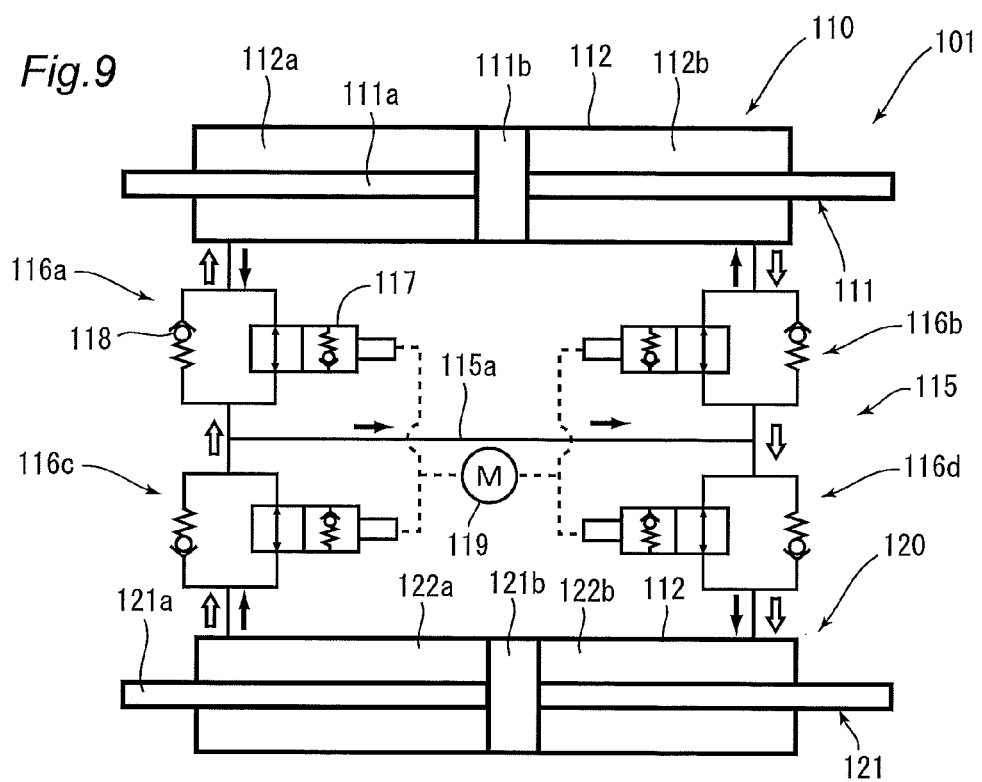
FIG. 9 is a schematic illustration of the damper of the three-wheeled vehicle according to the second preferred embodiment of the present invention.

Next, the construction of the damper 101 will be described in detail with reference to FIG. 9. As shown in FIG. 9, the piston 111 of the left damper 110 includes a rod-shaped piston rod 111a, and a piston body 111b provided in the middle of the piston rod 111a as measured along its length. The piston body 111b is movable in the cylinder 112, while the piston rod 111a extends through the piston body 111b and its ends protrude from the ends of the cylinder 112 as measured along its length.

The space inside the cylinder 112 is filled with hydraulic oil. The space inside the cylinder 112 is divided by the piston body 111b into two subspaces, i.e., a first subspace 112a and a second subspace 112b. A fluid channel 115a of a damping circuit 115 is connected with the first subspace 112a, while the fluid channel 115a of the damping circuit 115 is also connected with the second subspace 112b. This allows hydraulic oil to move between the first and second subspaces 112a and 112b of the cylinder 112 via the fluid channel 115a of the damping circuit 115.

As shown in FIG. 9, the right damper 120 is also connected with the damping circuit 115. In FIG. 9, character 121a denotes the piston rod, character 121b the piston body, character 122a the first subspace, and character 122b the second subspace. Hydraulic oil is movable between the first and second subspaces 122a and 122b of the right damper 120 via the fluid channel 115a of the damping circuit 115.

As shown in FIG. 9, the damping circuit 115 includes a plurality of flow rate adjustment portions 116a to 116d. Each of the flow rate adjustment portions 116a to 116d includes an electromagnetic adjustment valve 117 and a check valve 118. The electromagnetic adjustment valve 117 and check valve 118 are connected in parallel. The flow rate adjustment portions 116a to 116d are connected to the first subspaces 112a and 122a and second subspaces 112b and 122b of the left and right dampers 110 and 120 via the fluid channel 115a. The flow rate adjustment portions 116a to 116d are connected with each other via the fluid channel 115a.

In the present preferred embodiment, as shown in FIG. 9, one fluid channel connects the flow rate adjustment portions 116a and 116c connected with the first subspaces 112a and 122a, and the flow rate adjustment portions 116b and 116d connected with the second subspaces 112b and 122b. This reduces the number of fluid channels compared with implementations where a fluid channel connecting the flow rate adjustment portion 116a with the flow rate adjustment portion 116b and a fluid channel connecting the flow rate adjustment portion 116c with the flow rate adjustment portion 116d are separate, thus providing a compact arrangement.

The check valves 118 are preferably so-called non-return valves. The check valves 118 prevent hydraulic oil from flowing backward into the subspaces of the left and right dampers 110 and 120 to which the flow rate adjustment portions 116a and 116d are connected. That is, the check valves 118 are disposed to allow hydraulic oil to flow out of the first subspaces 112a and 122a and second subspaces 112b and 122b of the left and right dampers 110 and 120, while preventing hydraulic oil from flowing from the damping circuit 115 into the first subspaces 112a and 122a and second subspaces 112b and 122b.

The electromagnetic adjustment valves 117 are configured to switch between the state for allowing hydraulic oil to flow and the state for preventing hydraulic oil from flowing. More specifically, each electromagnetic adjustment valve 117 includes an electromagnetic valve and a spring. In each electromagnetic adjustment valve 117, a valve body (not shown) is positioned in place by the spring such that an oil path is defined inside to allow the hydraulic oil to flow. When hydraulic oil is not to flow into the damping circuit 115, each electromagnetic adjustment valve 117 moves the valve body of the electromagnetic valve to a position to close the oil path of the damping circuit 115. The electromagnetic adjustment valves 117 preferably is switched to the state for preventing hydraulic oil from flowing to lock the left and right dampers 110 and 120, as described further below. Thus, the electromagnetic adjustment valves 117 work as lock mechanisms for the left and right dampers 110 and 120.

In each electromagnetic adjustment valve 117, the electromagnetic valve is driven by the motor 119. In the present preferred embodiment, the motor 119 drives the electromagnetic valves of the electromagnetic adjustment valves 117 of the four flow rate adjustment portions 116a to 116d. That is, the motor 119 causes the electromagnetic valves of the electromagnetic adjustment valves 117 of the four flow rate adjustment portions 116a to 116d to switch between the state for allowing hydraulic oil to flow and the state for preventing hydraulic oil from flowing. In FIG. 9, the paths for transmitting power by the motor 119 are indicated by broken lines.

With the construction of the damper 101 as described above, when the electromagnetic adjustment valves 117 are in the state for allowing hydraulic oil to flow (shown in FIG. 9), hydraulic oil flows through the fluid channel 115a depending on the movement of the piston bodies 111b and 121b of the left and right dampers 110 and 120. Thus, hydraulic oil flows from the ones of the first subspaces 112a and 122a and second subspaces 112b and 122b of the left and right dampers 110 and 120 that have higher pressures to the ones that have lower pressures. At this moment, in the flow rate adjustment portions 116a to 116d, the check valves 118 prevent hydraulic oil from flowing into the first subspaces 112a and 122a and second subspaces 112b and 122b of the left and right dampers 110 and 120.

With the construction of the damper 101, hydraulic oil also moves in the damping circuit 115 when the left and right dampers 110 and 120 receive vibrations in the same phase or in opposite phases.

For example, it is supposed that, when the left and right dampers 110 and 120 receive vibrations in the same phase, the pressure in the first subspaces 112a and 122a of the left and right dampers 110 and 120 is larger than the pressure in the second subspaces 112b and 122b. Then, hydraulic oil in the first subspaces 112a and 122a flows through the fluid channel 115a to reach the second subspaces 112b and 122b (indicated by thick solid arrows in FIG. 9). When the pressure in the second subspaces 112b and 122b is larger than the pressure in the first subspaces 112a and 122a, hydraulic oil in the second subspaces 112b and 122b flows through the fluid channel 115a to reach the first subspaces 112a and 122a.

Further, for example, it is supposed that, when the left and right dampers 110 and 120 receive vibrations in opposite phases, the pressure in the second subspace 112b of the left damper 110 is larger than the pressure in the first subspace 112a, and the pressure in the first subspace 122a of the right damper 120 is larger than the pressure in the second subspace 122b. Then, hydraulic oil flows from the second subspace 112b of the left damper 110 to the second subspace 122b of the right damper 120, while hydraulic oil flows from the first subspace 122a of the right damper 120 to the first subspace 112a of the left damper 110 (indicated by hollow arrows in FIG. 9). When the pressure in the first subspace 112a of the left damper 110 is larger than the pressure in the second subspace 112b and the pressure in the second subspace 122b of the right damper 120 is larger than the pressure in the first subspace 122a, hydraulic oil flows from the first subspace 112a of the left damper 110 to the first subspace 122a of the right damper 120, while hydraulic oil flows from the second subspace 122b of the right damper 120 to the second subspace 112b of the left damper 110.

Furthermore, vibrations are damped by the damping circuit 115 even when only one of the left and right dampers 110 and 120 receives vibrations. For example, if only the left damper 110 receives vibrations and the pressure in the first subspace 112a is larger than the pressure in the second subspace 112b, hydraulic oil in the first subspace 112a flows through the damping circuit 115 to enter the second subspace 112b, which has a lower inner pressure.

As the motor 119 drives the electromagnetic valves of the electromagnetic adjustment valves 117 to prevent hydraulic oil from flowing through the electromagnetic adjustment valves 117, the flow of hydraulic oil in the damping circuit 115 is suppressed. Thus, the left and right dampers 110 and 120 are locked such that the piston bodies 111b and 121b in the left and right dampers 110 and 120 do not move. As such, similar to the damper 50 of the first preferred embodiment, the damper 101 of the present preferred embodiment also prevents leaning of the body frame 11.

In the present preferred embodiment, the damper 101 preferably includes a left damper 110 connecting the body frame 11 with the left lower arm 37, and a right damper 120 connecting the body frame 11 with the right lower arm 38. The left and right dampers 110 and 120 are arranged in a left-to-right direction to extend in a top-to-bottom direction.

This provides a compact damper 101. Further, the length of the damper is reduced compared with implementations where the damper is obliquely disposed. This reduces bending stresses in the damper caused by the link mechanism being deformed, thus improving the durability and robustness of the dampers.

Third Preferred Embodiment

Figure 10:
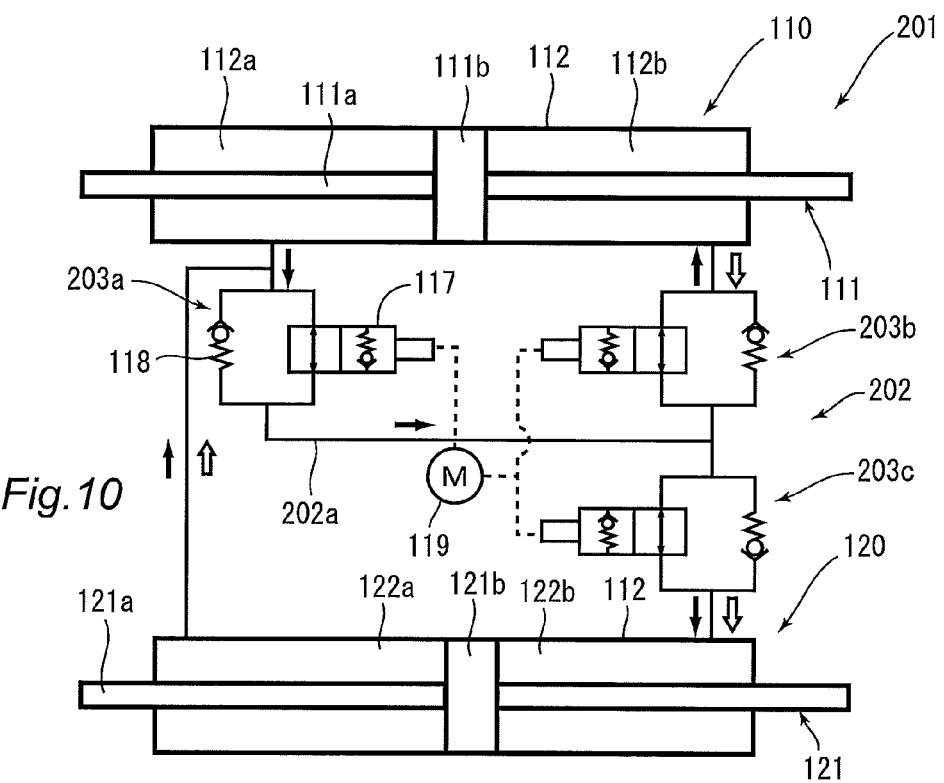
FIG. 10 is a schematic illustration of a damper of a three-wheeled vehicle according to a third preferred embodiment of the present invention.

FIG. 10 schematically illustrates a damper 201 of a three-wheeled vehicle according to a third preferred embodiment. In this third preferred embodiment, the construction of the damping circuit 202 is different from that in the second preferred embodiment. In the following description, the components that are the same as in the second preferred embodiment are labeled with the same characters and their description will not be made, and only the components different compared with the second preferred embodiment will be described.

More specifically, as shown in 10, a damping circuit 202 is connected with left and right dampers 110 and 120. The damping circuit 202 includes three flow rate adjustment portions 203a to 203c. The flow rate adjustment portion 203a is connected with the first subspaces 112a and 122a of the left and right dampers 110 and 120 via the fluid channel 202a. The flow rate adjustment portion 203b is connected with the second subspace 112b of the left damper 110 via the fluid channel 202a. The flow rate adjustment portion 203c is connected with the second subspace 122b of the right damper 120 via the fluid channel 202a.

The flow rate adjustment portions 203b and 203c are connected with each other by the fluid channel 202a. The flow rate adjustment portions 203b and 203c are connected with the flow rate adjustment portion 203a by the fluid channel 202a.

Similar to the flow rate adjustment portions 116a to 116d of the second preferred embodiment, the flow rate adjustment portions 203a to 203c each include an electromagnetic adjustment valve 117 and a check valve 118. In each electromagnetic adjustment valve 117, an electromagnetic valve, not shown, is driven by the motor 119. That is, in the present preferred embodiment, one motor 119 drives the electromagnetic adjustment valves 117 of three flow rate adjustment portions 203a to 203c.

Similar to the damping circuit 115 of the second preferred embodiment, the damping circuit 202 of the present preferred embodiment allows vibrations in the same phase and in opposite phases received by the left and right dampers 110 and 120 to be damped.

For example, it is assumed that, when the left and right dampers 110 and 120 receive vibrations in the same phase, the pressure in the first subspaces 112a and 122a of the left and right dampers 110 and 120 is larger than the pressure in the second subspaces 112b and 122b. Then, hydraulic oil in the first subspaces 112a and 122a flows through the fluid channel 202a to reach the second subspaces 112b and 122b (indicated by thick solid arrows in FIG. 10). When the pressure in the second subspaces 112b and 122b is larger than the pressure in the first subspaces 112a and 122a, hydraulic oil in the second subspaces 112b and 122b flows through the fluid channel 202a to reach the first subspaces 112a and 122a.

Further, for example, it is assumed that, when the left and right dampers 110 and 120 receive vibrations in opposite phases, the pressure in the second subspace 112b of the left damper 110 is larger than the pressure in the first subspace 112a, and the pressure in the first subspace 122a of the right damper 120 is larger than the pressure in the second subspace 122b. Then, hydraulic oil flows from the second subspace 112b of the left damper 110 to the second subspace 122b of the right damper 120, while hydraulic oil flows from the first subspace 122a of the right damper 120 to the first subspace 112a of the left damper 110 (indicated by hollow arrows in FIG. 10). When the pressure in the first subspace 112a of the left damper 110 is larger than the pressure in the second subspace 112b and the pressure in the second subspace 122b of the right damper 120 is larger than the pressure in the first subspace 122a, hydraulic oil flows from the first subspace 112a of the left damper 110 to the first subspace 122a of the right damper 120, while hydraulic oil flows from the second subspace 122b of the right damper 120 to the second subspace 112b of the left damper 110.

Thus, three flow rate adjustment portions 203a to 203c define a damping circuit 202 that is configured to damp vibrations in the same phase and in opposite phases received by the left and right dampers 110 and 120. This reduces the number of flow rate adjustment portions compared with the second preferred embodiment, thus reducing the cost of manufacturing the three-wheeled vehicle.

Even when only one of the left and right dampers 110 and 120 receives vibrations, the damper 201 damps vibrations. For example, when only the left damper 110 receives vibrations, hydraulic oil flows from the one of the first and second subspaces 112a and 112b that has a higher pressure to the one that has a lower pressure via the fluid channel 202a.

Fourth Preferred Embodiment

Figure 11:
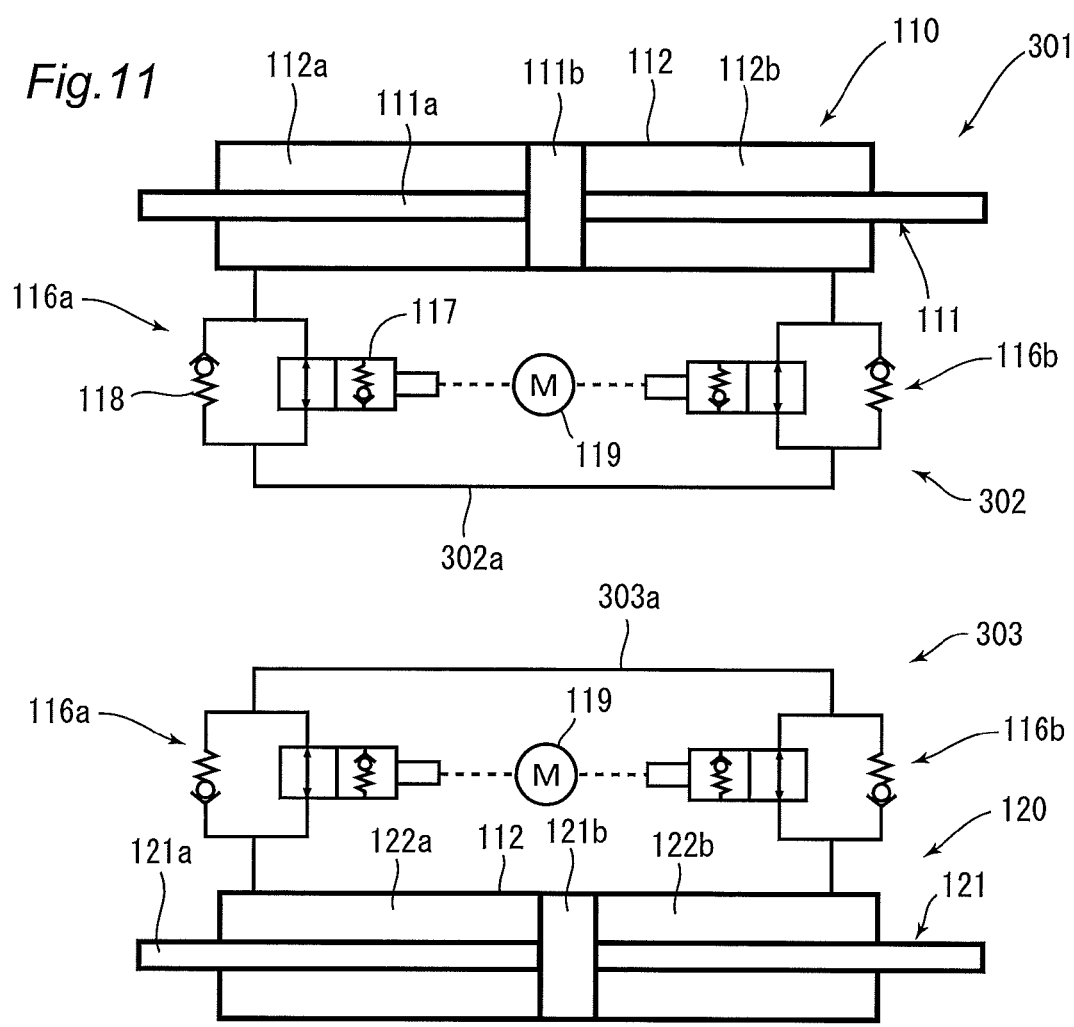
FIG. 11 is a schematic illustration of a damper of a three-wheeled vehicle according to a fourth preferred embodiment of the present invention.

FIG. 11 schematically illustrates a damper 301 of a three-wheeled vehicle according to a fourth preferred embodiment. The present preferred embodiment is different from the second preferred embodiment in the damping circuits 302 and 303. In the following description, the components that are the same as in the second preferred embodiment are labeled with the same characters and their description will not be made, and only the components different compared with the second preferred embodiment will be described.

More specifically, as shown in FIG. 11, the damper 301 includes damping circuits 302 and 303 that are connected with the left and right dampers 110 and 120, respectively. Each of the damping circuits 302 and 303 includes two flow rate adjustment portions 116a and 116b.

The flow rate adjustment portion 116a of the damping circuit 302 is connected with the first subspace 112a of the left damper 110 via the fluid channel 302a, while the flow rate adjustment portion 116a of the damping circuit 303 is connected with the first subspace 122a of the right damper 120 via the fluid channel 303a. The flow rate adjustment portion 116b of the damping circuit 302 is connected with the second subspace 112b of the left damper 110 via the fluid channel 302a, while the flow rate adjustment portion 116b of the damping circuit 303 is connected with the second subspace 122b of the right damper 120 via the fluid channel 303a.

In the damping circuits 302 and 303, the flow rate adjustment portions 116a and the flow rate adjustment portions 116b are connected by the fluid channels 302a and 303a. In the present preferred embodiment, the damping circuits 302 and 303 are separate circuits.

Similar to the second and third preferred embodiments, each of the flow rate adjustment portions 116a and 116b includes an electromagnetic adjustment valve 117 and a check valve 118. One motor 119 drives the electromagnetic adjustment valves 117 of the flow rate adjustment portions 116a and 116b.

With the construction of the present preferred embodiment, the damping circuits 302 and 303 damp vibrations received by the left and right dampers 110 and 120. As the left and right dampers 110 and 120 are connected with separate damping circuits, the left and right dampers 110 and 120 preferably have different damping properties.

Other Preferred Embodiments

While preferred embodiments of the present invention have been described, the above preferred embodiments are merely examples that can be used to carry out the present invention. Thus, the present invention is not limited to the above preferred embodiments, which can be modified as necessary without departing from the spirit of the invention.

In the preferred embodiments described above, the damper 50, left damper 110, and right damper 120 are preferably so-called through-rod type dampers where the piston rod 51a, 111a, or 121a extends through the ends of the cylinders 52, 112, or 122. Alternatively, the damper may be one other than a through-rod type one.

In the preferred embodiments described above, the link mechanism 30 is preferably a so-called double wishbone link mechanism where the left and right arms connected with the left and right side rods 31 and 32 are separate components and rotatably connected with the head pipe 21. Alternatively, the link mechanism may be any link mechanism such as a so-called parallel link mechanism where the left and right side rods 31 and 32 are connected by a coupling member extending in a horizontal direction with respect to the vehicle.

In the first preferred embodiment described above, as shown in FIGS. 3 and 4, the damping circuit 55 of the damping assembly 50 includes two orifices 58a and 58b, where the fluid channel switching valve 57 switches between the fluid channels to allow hydraulic oil to flow into one orifice 58a or 58b. Alternatively, the damper may include three or more orifices, where a fluid channel switching valve may switch among the orifices to allow hydraulic oil to flow. Alternatively, as shown in FIG. 7, the damping circuit 61 may include one orifice 62 and an electromagnetic adjustment valve 63. In such implementations, the damping properties of the damper cannot be changed in two stages, as in the first preferred embodiment described above; still, it is possible that the orifice 62 preferably provides a damping force and the electromagnetic adjustment valve 63 preferably locks the damper, for example. Further, although not shown, the damping circuit may include no orifice and include only a flow rate adjustment portion that is configured to adjust the flow rate of hydraulic oil.

In the first preferred embodiment described above, the fluid channel narrow portions preferably are the orifices 58a and 58b, the flow rate adjustment portion is the electromagnetic adjustment valve 56, and the fluid channel switch is the fluid channel switching valve 57. Alternatively, the fluid channel narrow portion may have any other configuration that is capable of changing the flow passage area, such as an adjustment valve. Further, the flow rate adjustment portion or fluid channel switch may not be a valve and have other configurations.

In the first preferred embodiment, the damper 50 is preferably provided between the left lower arm 37 and right upper arm 36 of the link mechanism 30. Alternatively, the damper 50 may be provided between the left upper arm 35 and right lower arm 37, or between other arms as far as the assembly is capable of damping vibrations in opposite phases occurring in the left and right front wheels 3.

In the second preferred embodiment described above, the left damper 110 is connected with the body frame 11 and left lower arm 37, while the right damper 120 is connected with the body frame 11 and right lower arm 38. Alternatively, the left damper 110 may be connected with the body frame 11 and left upper arm 35 while the right damper 120 may be connected with the body frame 11 and right upper arm 36.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type vehicle comprising:
   a body frame;
   left and right front wheels;
   a link mechanism configured to connect the left and right front wheels with the body frame;
   a shock absorber configured to damp vibrations in a same phase occurring in the left and right front wheels; and
   a damper configured to damp vibrations in opposite phases occurring in the left and right front wheels; wherein
   the damper is configured such that its damping force increases at least in a certain frequency range as a frequency of the vibrations in opposite phases increases.

2. The straddle-type vehicle according to claim 1, wherein the damper is configured to produce a damping force against a leaning movement of the body frame from an upright position toward a side of the vehicle.

3. The straddle-type vehicle according to claim 1, wherein the link mechanism includes:
   a left side rod and a right side rod to rotatably support the left and right front wheels, respectively;
   a left upper arm and a left lower arm rotatably connected with the left side rod and the body frame; and
   a right upper arm and a right lower arm rotatably connected with the right side rod and the body frame.

4. The straddle-type vehicle according to claim 3, wherein the damper is configured to produce a larger damping force than the shock absorber when the vibrations in opposite phases occur in the left and right front wheels.

5. The straddle-type vehicle according to claim 3, wherein the damper is configured to produce a larger damping force when the vibrations in opposite phases occur in the left and right front wheels than when the vibrations in the same phase occur in the left and right front wheels.

6. The straddle-type vehicle according to claim 4, wherein the shock absorber connects at least one of the left side rod, the left upper arm, and the left lower arm with at least one of the right side rod, the right upper arm, and the right lower arm.

7. The straddle-type vehicle according to claim 4, wherein the damper connects the left upper arm with the right lower arm, or connects the right upper arm with the left lower arm.

8. The straddle-type vehicle according to claim 4, wherein the damper includes:
   a left damper connected with the body frame and one of the left upper arm and the left lower arm; and
   a right damper connected with the body frame and one of the right upper arm and the right lower arm; wherein
   the left and right dampers are arranged in a left-to-right direction and extend in a top-to-bottom direction.

9. The straddle-type vehicle according to claim 4, wherein the damper includes:
   a cylinder;
   a piston body that divides a space inside the cylinder into two subspaces and is configured to move reciprocally inside the cylinder;
   a piston rod extending from the piston body toward and through ends of the cylinder; and
   a fluid channel connected with the two subspaces inside the cylinder to allow a fluid to move therethrough depending on a movement of the piston body in the cylinder.

10. The straddle-type vehicle according to claim 4, further comprising:
    a vehicle speed detector configured to measure a vehicle speed; and
    a controller programmed to control an operation of the damper depending on the vehicle speed detected by the vehicle speed detector;
    the damper includes:
       a cylinder;
       a piston body that divides a space inside the cylinder into two subspaces and is configured to move reciprocally inside the cylinder;
       a fluid channel connected with the two subspaces inside the cylinder to allow a fluid to move therethrough depending on a movement of the piston body inside the cylinder; and
       a shutoff valve configured to close the fluid channel; wherein
    the controller is programmed to control the shutoff valve to close the fluid channel when the vehicle speed detected by the vehicle speed detector is not more than a predetermined level.

11. The straddle-type vehicle according to claim 4, wherein the damper includes:
    a cylinder;
    a piston body that divides a space inside the cylinder into two subspaces and is configured to move reciprocally inside the cylinder;
    a fluid channel connected with the two subspaces inside the cylinder to allow a fluid to move therethrough depending on a movement of the piston body in the cylinder; and
    a fluid channel narrow portion provided in the fluid channel.

12. The straddle-type vehicle according to claim 4, wherein the damper is configured such that an increase rate in the damping force relative to a change in the frequency of the vibrations in opposite phases increases step-wise depending on the frequency.

13. The straddle-type vehicle according to claim 12, wherein the damper further includes:
    a cylinder;
    a piston body that divides a space inside the cylinder into two subspaces and is configured to move reciprocally inside the cylinder;

a fluid channel connected with the two subspaces inside the cylinder to allow a fluid to move therethrough depending on a movement of the piston body in the cylinder;

a plurality of fluid channel narrow portions provided in the fluid channel in parallel or substantially in parallel with each other to produce different damping forces; and a fluid channel switch provided in the fluid channel to switch among the fluid channel narrow portions to allow the fluid to flow therethrough depending on the frequency of the vibrations in opposite phases.

* * * * *